US010356555B2

(12) United States Patent
George et al.

(10) Patent No.: US 10,356,555 B2
(45) Date of Patent: Jul. 16, 2019

(54) LOCATION TRACKING USING FIBER OPTIC ARRAY CABLES AND RELATED SYSTEMS AND METHODS

(71) Applicant: Corning Optical Communications LLC, Hickory, NC (US)

(72) Inventors: Jacob George, Horseheads, NY (US); Michael Sauer, Cornng, NY (US); Dean Michael Thelen, Addison, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 16/051,764

(22) Filed: Aug. 1, 2018

(65) Prior Publication Data

US 2018/0343542 A1 Nov. 29, 2018

Related U.S. Application Data

(63) Continuation of application No. 15/425,187, filed on Feb. 6, 2017, now Pat. No. 10,070,258, which is a
(Continued)

(51) Int. Cl.
*H04B 10/00* (2013.01)
*H04W 4/02* (2018.01)
(Continued)

(52) U.S. Cl.
CPC ............... *H04W 4/023* (2013.01); *G01S 5/14* (2013.01); *H04B 10/25754* (2013.01);
(Continued)

(58) Field of Classification Search
USPC ................................................. 398/115–117
See application file for complete search history.

(56) References Cited

U.S. PATENT DOCUMENTS 3,986,182 A * 10/1976 Hackett ................... G01S 13/56
340/525
4,867,527 A * 9/1989 Dotti .................... G02B 6/4416
385/101
(Continued)

FOREIGN PATENT DOCUMENTS

EP 0732827 A2 9/1996
EP 1124211 A2 8/2001

OTHER PUBLICATIONS

AU2010276451 Patent Examination Report No. 1; dated Jul. 1, 2014; 3 Pages; Australian Government IP Australia.
(Continued)

*Primary Examiner* — Agustin Bello
(74) *Attorney, Agent, or Firm* — C. Keith Montgomery

(57) ABSTRACT

Fiber optic array cables and related systems and methods to determine and/or track locations of objects are disclosed. The fiber optic array cables can be employed in an optical-fiber-based communication system, including a centralized optical-fiber based communication system. In one embodiment, the fiber optic array cable is configured to carry optical RF or radio-over-fiber (RoF) signals to establish communications with objects. The fiber optic array cable includes multiple reference units along the length of the cable. The reference units can be configured to convert received optical RF signals into electrical RF signals to establish RF communications with objects capable of receiving electrical RF signals. The reference units are also configured to convert received electrical RF signals from the objects into optical RF signals, which are then used to determine the location of the object. Having the availability of the multiple reference units on one or more the fiber optic array cables can provide enhanced reliability in tracking objects.

16 Claims, 21 Drawing Sheets

Related U.S. Application Data continuation of application No. 12/509,099, filed on Jul. 24, 2009, now Pat. No. 9,590,733.

(51) Int. Cl.
*H04B 10/2575* (2013.01)
*G01S 5/14* (2006.01)
*H04B 10/80* (2013.01)
*H04W 16/26* (2009.01)
*H04W 84/12* (2009.01)

(52) U.S. Cl.
CPC ..... *H04B 10/25756* (2013.01); *H04B 10/808* (2013.01); *H04W 16/26* (2013.01); *H04W 84/12* (2013.01)

(56) References Cited

U.S. PATENT DOCUMENTS

| | | | | |
|---|---|---|---|---|
| 4,896,939 | A * | 1/1990 | O'Brien | G02B 6/3816 174/110 R |
| 4,916,460 | A * | 4/1990 | Powell | H01Q 3/2676 343/853 |
| 5,189,718 | A * | 2/1993 | Barrett | G02B 6/4416 174/117 R |
| 5,210,788 | A * | 5/1993 | Nilssen | H04M 1/725 455/462 |
| 5,268,971 | A * | 12/1993 | Nilsson | G02B 6/4407 385/101 |
| 5,329,576 | A * | 7/1994 | Handforth | H04B 7/26 379/55.1 |
| 5,379,455 | A * | 1/1995 | Koschek | H01Q 21/0025 343/858 |
| 5,557,698 | A * | 9/1996 | Gareis | G02B 6/4416 385/100 |
| 5,574,815 | A * | 11/1996 | Kneeland | G02B 6/3817 174/70 R |
| 5,586,167 | A * | 12/1996 | Handforth | H04B 7/26 455/410 |
| 5,748,813 | A * | 5/1998 | Cassidy | H04B 10/1149 385/24 |
| 5,812,086 | A * | 9/1998 | Bertiger | G01S 19/11 342/357.48 |
| 5,812,296 | A * | 9/1998 | Tarusawa | H04B 10/25753 375/254 |
| 5,903,834 | A * | 5/1999 | Wallstedt | H04W 88/085 455/422.1 |
| 5,936,527 | A * | 8/1999 | Isaacman | G06K 7/10316 340/572.1 |
| 5,969,837 | A * | 10/1999 | Farber | H04W 88/085 379/56.2 |
| 6,005,884 | A * | 12/1999 | Cook | H04W 88/085 370/338 |
| 6,034,966 | A * | 3/2000 | Ota | H04B 7/2643 370/431 |
| 6,218,979 | B1 * | 4/2001 | Barnes | G01S 13/0209 342/22 |
| 6,236,789 | B1 * | 5/2001 | Fitz | G02B 6/4416 385/100 |
| 6,314,163 | B1 * | 11/2001 | Acampora | H04B 10/11 379/56.2 |
| 6,323,980 | B1 * | 11/2001 | Bloom | H04B 10/1125 398/116 |
| 6,337,754 | B1 * | 1/2002 | Imajo | H04B 10/25752 398/115 |
| 6,353,600 | B1 * | 3/2002 | Schwartz | H04W 28/26 370/328 |
| 6,417,942 | B1 * | 7/2002 | Seto | H04B 10/0775 398/5 |
| 6,486,907 | B1 * | 11/2002 | Farber | H04H 40/90 348/E7.05 |
| 6,512,478 | B1 * | 1/2003 | Chien | G01S 5/0215 340/572.1 |
| 6,518,916 | B1 * | 2/2003 | Ashihara | G01S 7/412 342/133 |
| 6,519,395 | B1 * | 2/2003 | Bevan | G02B 6/4446 385/100 |
| 6,731,880 | B2 * | 5/2004 | Westbrook | H04B 10/29 398/115 |
| 6,782,048 | B2 * | 8/2004 | Santhoff | H04B 1/7163 375/240 |
| 6,801,767 | B1 * | 10/2004 | Schwartz | H04B 10/25755 398/115 |
| 6,883,710 | B2 * | 4/2005 | Chung | H04L 63/12 235/385 |
| 6,885,846 | B1 * | 4/2005 | Panasik | H01Q 21/007 455/14 |
| 6,889,060 | B2 * | 5/2005 | Fernando | H04B 10/25754 375/229 |
| 6,900,732 | B2 | 5/2005 | Richards | |
| 6,963,727 | B2 | 11/2005 | Shreve | |
| 7,020,473 | B2 * | 3/2006 | Splett | G01S 13/878 455/456.1 |
| 7,047,028 | B2 * | 5/2006 | Cagenius | H04B 10/25755 398/115 |
| 7,072,586 | B2 * | 7/2006 | Aburakawa | H04B 10/25753 398/115 |
| 7,084,769 | B2 * | 8/2006 | Bauer | G06K 7/0008 340/572.7 |
| 7,113,780 | B2 * | 9/2006 | McKenna | H01Q 21/007 455/431 |
| 7,129,886 | B2 * | 10/2006 | Hall | G01S 7/282 342/28 |
| 7,177,623 | B2 * | 2/2007 | Baldwin | H04W 4/90 455/404.2 |
| 7,196,656 | B2 * | 3/2007 | Shirakawa | G01S 7/032 342/147 |
| 7,221,906 | B2 * | 5/2007 | Lim | H04B 10/25755 398/116 |
| 7,256,727 | B2 * | 8/2007 | Fullerton | G01S 7/414 342/27 |
| 7,260,369 | B2 | 8/2007 | Feher | |
| 7,356,019 | B2 * | 4/2008 | Hirt | H04B 1/7174 370/307 |
| 7,388,892 | B2 * | 6/2008 | Nishiyama | H04B 10/807 359/196.1 |
| 7,394,883 | B2 * | 7/2008 | Funakubo | H04W 88/08 375/267 |
| 7,495,560 | B2 * | 2/2009 | Easton | G08B 21/0275 340/572.1 |
| 7,501,948 | B2 * | 3/2009 | Roemerman | G06Q 10/08 235/375 |
| 7,513,425 | B2 * | 4/2009 | Chung | H04L 63/12 235/385 |
| 7,546,138 | B2 * | 6/2009 | Bauman | H04B 7/0842 455/426.1 |
| 7,583,642 | B2 * | 9/2009 | Rumpf | H04B 10/25752 370/338 |
| 7,590,354 | B2 * | 9/2009 | Sauer | H01Q 9/285 398/115 |
| 7,627,218 | B2 * | 12/2009 | Hurley | G02B 6/4457 385/100 |
| 7,627,250 | B2 * | 12/2009 | George | H04B 10/25759 398/115 |
| 7,652,512 | B2 | 1/2010 | Ho et al. | |
| 7,679,562 | B2 * | 3/2010 | Shirakawa | G01S 13/003 342/118 |
| 7,787,823 | B2 * | 8/2010 | George | H04B 10/25756 455/41.2 |
| 7,848,654 | B2 * | 12/2010 | Sauer | H04B 7/022 370/352 |
| 7,864,673 | B2 * | 1/2011 | Bonner | H04L 63/08 370/230 |
| 7,916,066 | B1 * | 3/2011 | Osterweil | A61B 5/1117 340/573.1 |
| 7,952,512 | B1 * | 5/2011 | Delker | G01S 13/825 342/126 |
| 8,050,244 | B2 * | 11/2011 | Rumpf | H04B 10/25752 370/338 |

(56) References Cited

U.S. PATENT DOCUMENTS

| | | | | |
|---|---|---|---|---|
| 8,457,013 | B2* | 6/2013 | Essinger | H04W 4/50 370/254 |
| 8,526,826 | B2* | 9/2013 | Eisenwinter | H04B 10/25756 398/173 |
| 8,982,904 | B2* | 3/2015 | Binder | H04B 3/542 370/463 |
| 9,443,358 | B2* | 9/2016 | Breed | G07C 5/008 |
| 10,181,060 | B2* | 1/2019 | Krug | G06K 7/0008 |
| 2001/0017896 | A1* | 8/2001 | Murakami | H04L 1/0025 375/260 |
| 2002/0048071 | A1* | 4/2002 | Suzuki | H04B 10/25755 398/141 |
| 2002/0147016 | A1* | 10/2002 | Arazi | H04M 1/725 455/443 |
| 2003/0007214 | A1* | 1/2003 | Aburakawa | H04B 10/25756 398/115 |
| 2003/0045284 | A1* | 3/2003 | Copley | H04W 88/085 455/426.1 |
| 2003/0078074 | A1 | 4/2003 | Sesay et al. | |
| 2003/0161637 | A1* | 8/2003 | Yamamoto | H04B 10/2503 398/167.5 |
| 2003/0165287 | A1* | 9/2003 | Krill | H04B 10/2503 385/24 |
| 2003/0174099 | A1* | 9/2003 | Bauer | G06K 7/0008 343/893 |
| 2004/0047313 | A1* | 3/2004 | Rumpf | H04B 10/25752 370/335 |
| 2004/0091033 | A1* | 5/2004 | Chen | H01Q 3/22 375/226 |
| 2004/0175173 | A1* | 9/2004 | Deas | H04B 1/7163 398/42 |
| 2004/0179852 | A1* | 9/2004 | Westbrook | H04B 10/29 398/183 |
| 2004/0233877 | A1* | 11/2004 | Lee | H04B 1/7163 370/338 |
| 2005/0025487 | A1* | 2/2005 | Kwon | H04B 10/278 398/83 |
| 2006/0033662 | A1 | 2/2006 | Ward et al. | |
| 2006/0077172 | A1* | 4/2006 | Fukumoto | H04B 13/00 345/156 |
| 2006/0120730 | A1* | 6/2006 | Drentea | H04B 1/28 398/201 |
| 2007/0025738 | A1* | 2/2007 | Moore | H04B 10/1149 398/189 |
| 2007/0025739 | A1* | 2/2007 | Moore | H04B 10/40 398/202 |
| 2007/0057761 | A1 | 3/2007 | Johnson | |
| 2007/0172241 | A1* | 7/2007 | Kwon | H04B 1/7163 398/115 |
| 2007/0257796 | A1 | 11/2007 | Easton et al. | |
| 2007/0286599 | A1 | 12/2007 | Sauer et al. | |
| 2008/0080863 | A1 | 4/2008 | Sauer et al. | |
| 2008/0100706 | A1* | 5/2008 | Breed | B60C 11/24 348/143 |
| 2008/0152344 | A1* | 6/2008 | Deas | H04L 12/2801 398/63 |
| 2008/0212969 | A1* | 9/2008 | Fasshauer | H01Q 1/1242 398/116 |
| 2008/0246613 | A1* | 10/2008 | Linstrom | G08B 13/19695 340/572.4 |
| 2008/0247758 | A1* | 10/2008 | Nichols | G01S 5/16 398/115 |
| 2008/0273844 | A1* | 11/2008 | Kewitsch | G02B 6/3895 385/101 |
| 2009/0041413 | A1 | 2/2009 | Hurley | |
| 2009/0058593 | A1* | 3/2009 | Breed | B60C 11/24 340/5.2 |
| 2009/0097855 | A1* | 4/2009 | Thelen | H04B 10/25752 398/115 |
| 2009/0140923 | A1* | 6/2009 | Graves | A61B 5/02055 342/450 |
| 2009/0316842 | A1* | 12/2009 | Lu | H04L 1/20 375/346 |
| 2009/0322488 | A1* | 12/2009 | Kanagala | H04W 52/0229 340/10.3 |
| 2011/0019999 | A1* | 1/2011 | George | H04B 10/25754 398/58 |
| 2013/0136119 | A1* | 5/2013 | Hund | H04B 1/7183 370/350 |
| 2017/0149504 | A1* | 5/2017 | Daniel | H04B 10/25753 |
| 2017/0150316 | A1* | 5/2017 | George | H04B 10/25754 |

OTHER PUBLICATIONS

English Translation of CN2010800391363 Office Action dated Nov. 18, 2014.

FCC—"Revision of Part 15 of the Commission's Rules Regarding Ultra-Wideband Transmission Systems"; Released Apr. 22, 2002, 118 Pages; Federal Communications Commission Washington, DC.

Gezici et al; "Localization via Ultra-Wideband Radios"; IEEE Signal Processing Magazine; (70) Jul. 2005, 15 Pages.

Ingram et al; "Ultrawideband Indoor Positioning Systems and Their Use in Emergencies"; IEEE; 2004; pp. 706-715.

International Search Report and Written Opinion of the International Searching Authority; PCT/US2010/042420; dated Nov. 4, 2010; 17 Pages; European Patent Office.

Luo et al; "Centralized UWB/WLAN Distribution Network Using Low Cost Radio Over Multimode Fiber Technology"; IEEE; 2005; pp. 799-801.

Sauer et al; "Experimental Investigation of Multimode Fiber Bandwidth Requirements for 5.2 GHZ WLAN Signal Transmission"; IEEE Opt. Fiber. Comm. Conf. p. 3, 2006.

Sauer et al; "Experimental Study of Radio Frequency Transmission Over Standard and High-Bandwidth Multimode Optical Fibers"; IEEE Microwav. Photon. Conf. pp. 99-102; 2005.

Schwarz et al; "Accuracy of a Commercial UWB 3D Location/Tracking System and Its Impact on LT Application Scenarios"; IEEE International Conference on Ultra-Wideband; 2005; Paper #1568962182; 5 Pages.

Shibuya et al; "A High-Accuracy Pedestrian Positioning Information System Using Pico Cell Techniques"; IEEE; 2000; pp. 496-500.

Wah et al; "Wireless Ultra Wideband Communications Using Radio Cover Fiber"; IEEE; 2003; pp. 265-269.

Yu et al; "Performance of UWB Position Estimation Based on Time-of-Arrival Measurements"; IEEE; 2004, pp. 400-404.

* cited by examiner

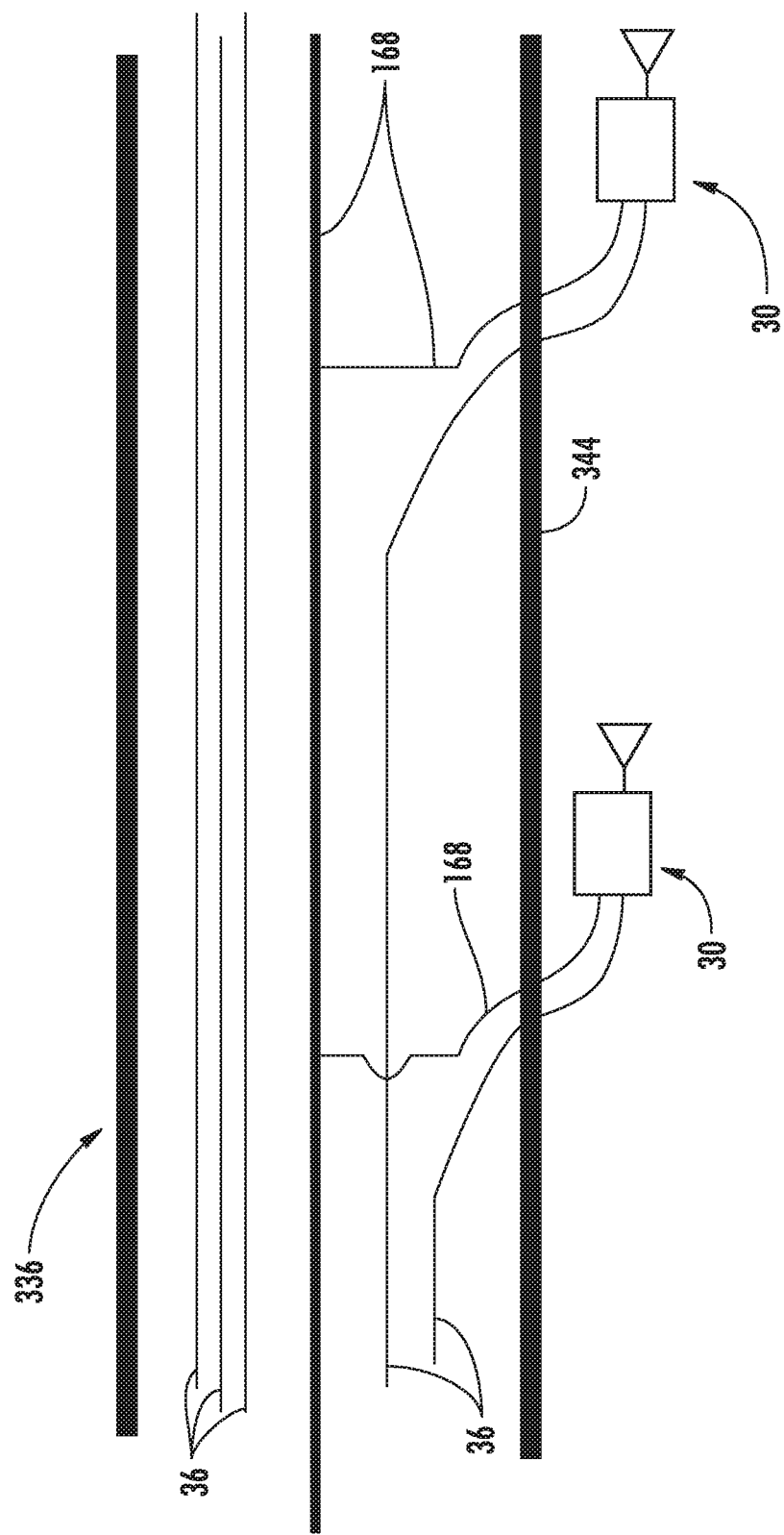

LOCATION TRACKING USING FIBER OPTIC ARRAY CABLES AND RELATED SYSTEMS AND METHODS

This application is a continuation of U.S. patent application Ser. No. 15/425,187, filed Feb. 6, 2017, which is a continuation of U.S. application Ser. No. 12/509,099, filed Jul. 24, 2009, now U.S. Pat. No. 9,590,733, the contents of which are hereby incorporated herein by reference in their entireties, and the benefit of priority under 35 U.S.C § 120 is hereby claimed.

BACKGROUND

Field of the Disclosure

The technology of the disclosure relates generally to wireless communication systems, and more particularly to optical-fiber-based wireless cables, systems, and methods.

Technical Background

Wireless communication is rapidly growing, with ever-increasing demands for high-speed mobile data communication. As an example, "wireless fidelity" or "WiFi" systems and wireless local area networks (WLANs) are being deployed in many different types of areas (office buildings, airports, libraries, etc.). Wireless communication systems communicate with wireless devices called "clients," which reside within the wireless range or "cell coverage area" to communicate with the access point device.

One approach of deploying a wireless communication system involves use of "picocells." Picocells are radio-frequency (RF) coverage areas. Picocells can have a radius in the range from a few meters up to twenty meters as an example. Combining a number of access point devices creates an array of picocells that cover an area called a "picocellular coverage area." Because each picocell covers a small area, there are typically only a few users (clients) per picocell. This allows for simultaneous high coverage quality and high data rates for the wireless system users.

One advantage of picocells is the ability to wireless communicate with remotely located communication devices within the picocellular coverage area. It may also be desirable to determine and/or track the location of such devices within the picocellular coverage area.

SUMMARY OF THE DETAILED DESCRIPTION

Embodiments disclosed in the detailed description include fiber optic array cables and related systems and methods. Such cables, systems, and methods can be employed to determine and/or track the location of an object. The fiber optic array cable can be employed in an optical-fiber-based communication system, including but not limited to a centralized optical-fiber-based communication system. In one embodiment, the fiber optic array cable includes multiple reference units along the length of the cable. Each reference unit in the fiber optic array cable can include an antenna, and an electrical-to-optical (E/O) converter, and an optical-to-electrical (O/E) converter to convert electrical RF signals to optical RF signals, and vice versa, respectively. The reference units can be configured to convert received optical RF signals into electrical RF signals to establish RF communications with objects capable of receiving electrical RF signals. The reference units can also be configured to convert received electrical RF signals from the objects into optical RF signals, which are then used to determine the location of the object.

Having the availability of the multiple reference units on one or more the fiber optic array cables can provide enhanced reliability in tracking objects, including objects in an indoor environment. The multiple reference units of the fiber optic array cables disclosed herein can increase the probability of having sufficient communication paths to the object being tracked. Further, providing the multiple reference units in a fiber optic array cable allows the use of optical fiber as a transmission medium for communications to the tracked objects. The fiber optic array cables may be provided such that remote objects can be tracked using optical fiber communications with high bandwidth speeds.

According to one embodiment disclosed herein, RF signals, such as UltraWideBand-Impulse Radio (UWB-IR) signals for example, can be transmitted over the fiber optic array cables to determine and/or track the location of the object. Systems using UWB-IR signals in particular, although not limiting herein, can provide accurate ranging capability. The accurate ranging capability of UWB-IR systems does not deteriorate when UWB-IR signals are transmitted over a centralized RoF system. Thus, by transmitting UWB-IR signals over a centralized optical-fiber-based communication system that includes one or more fiber optic array cables having multiple reference units, accurate and reliable three-dimensional tracking of a target object can be enabled.

Other embodiments disclosed in the detailed description provide a centralized optical-fiber-based wireless communication system that incorporates one or more of the fiber optic reference array cables having multiple reference units disposed along a length of the fiber optic cable. Each of the multiple reference units comprises at least one antenna, an E/O converter, and an O/E converter. In this regard, each of the reference units may form one or more picocells. The centralized optical-fiber-based wireless communication system includes a central head-end station having a plurality of service units and at least one fiber optic reference array cable remote from the central head-end station. An electrical power line extends from the central head-end station to provide power to the E/O converter and the O/E converter. A service unit in the central head-end station is configured to cause an RF signal, such as an UWB signal, to be transmitted from one or more of the antennas in the multiple reference units to a wireless coverage area associated with the reference unit. A corresponding signal is received from one or more of the plurality of the multiple reference units indicative of a distance between each of the respective reference units and an object in the coverage areas associated with the respective reference unit. These corresponding signals received from the reference units can be processed to determine a location of the object.

A further embodiment disclosed herein includes a method of tracking an object using at least one fiber optic reference array cable as disclosed herein. In one embodiment, the method comprises transmitting a RF signal from at least one antenna of a plurality of the multiple reference units to respective coverage areas associated with the respective reference units. The coverage areas may be picocellular coverage areas as an example. The RF signal may be an UWB RF signal, as an example. Corresponding signals are received at a plurality of the multiple reference units from an object in the corresponding picocellular coverage area. A distance from each of a plurality of the respective reference units to the object is determined to obtain a plurality of determined distances based on the received corresponding signal. The location of the object is determined based on the plurality of determined distances.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

The foregoing and other features, aspects, and advantages of the present disclosure may be better understood when the following detailed description is read with reference to the accompanying drawings, in which:

FIG. 3B is a schematic diagram similar to FIG. 3A, illustrating an alternate embodiment of a fiber optic array cable;

DETAILED DESCRIPTION OF THE PREFERRED EMBODIMENTS

Figure 1:
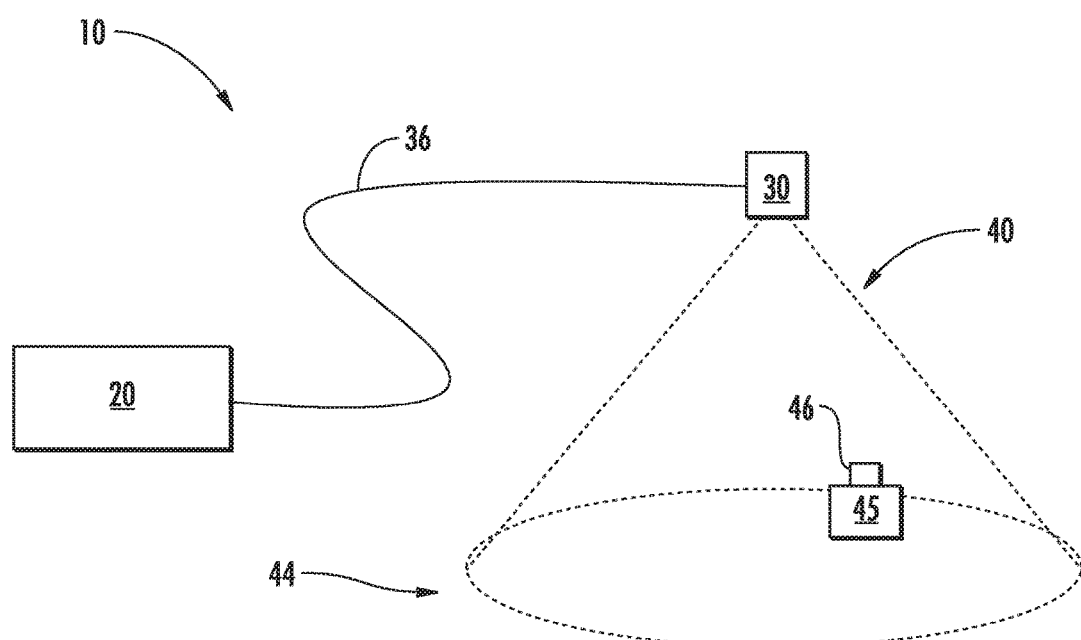
FIG. 1 is a schematic diagram of an exemplary generalized embodiment of an optical-fiber-based wireless picocellular system.

Reference will now be made in detail to the preferred embodiments of the present invention, examples of which are illustrated in the accompanying drawings, in which some, but not all embodiments are shown. Indeed, the concepts may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic array cables and related systems and methods. Such cables, systems, and methods can be employed to determine and/or track the location of an object. The fiber optic array cable can be employed in an optical-fiber-based communication system, including but not limited to a centralized optical-fiber-based communication system. In one embodiment, the fiber optic array cable includes multiple reference units along the length of the cable. Each reference unit in the fiber optic array cable can include an antenna, and an electrical-to-optical (E/O) converter and an optical-to-electrical (O/E) converter to convert electrical RF signals to optical RF signals, and vice versa, respectively. The reference units can be configured to convert received optical RF signals into electrical RF signals to establish RF communications with objects capable of receiving electrical RF signals. The reference units can also be configured to convert received electrical RF signals from the objects into optical RF signals, which are then used to determine the location of the object.

Having the availability of the multiple reference units on one or more of the fiber optic array cables can provide enhanced reliability in tracking objects, including objects in an indoor environment. The multiple reference units of the fiber optic array cables disclosed herein can increase the probability of having sufficient communication paths to the object being tracked. Further, providing the multiple reference units in a fiber optic array cable allows the use of optical fiber as a transmission medium for communications to the tracked objects. The fiber optic array cables may be provided such that remote objects can be tracked using high bandwidth optical fiber.

According to one embodiment disclosed herein, RF signals, such as UltraWideBand-Impulse Radio (UWB-IR) signals for example, can be transmitted over the fiber optic array cables to determine and/or track the location of the object. Systems using UWB-IR signals in particular, although not limiting herein, can provide accurate ranging capability. The accurate ranging capability of UWB-IR systems does not deteriorate when UWB-IR signals are transmitted over a centralized RoF system. Thus, by transmitting UWB-IR signals over a centralized optical-fiber-based communication system that includes one or more fiber optic array cables having multiple reference units, accurate and reliable three-dimensional tracking of a target object can be enabled.

Before discussing the particular systems and methods for location tracking of an object by transmitting RF signals, including UWB-IR signals in one embodiment, over a centralized RoF communication system that includes one or more of the fiber optic reference array cables having multiple reference units, FIGS. 1-10 are provided to discuss examples of an optical-fiber-based wireless communication system which may employ the fiber optic array cables and other systems and methods described herein to track the location of an object.

FIG. 1 is a schematic diagram of a generalized embodiment of an optical-fiber-based wireless picocellular system 10. The system 10 includes a head-end unit 20, one or more transponder or remote antenna units 30, or simply "remote units" 30, and an optical fiber RF communication link 36 that optically couples the head-end unit 20 to the remote unit 30. As discussed in detail below, system 10 has a picocell 40 substantially centered about remote unit 30. The remote units 30 form a picocellular coverage area 44. When the remote units 30 are used in a fiber optic reference array cable for the purpose of tracking the location of an object, as discussed below, the remote units 30 are hereafter referred to as "reference units 30." The head-end unit 20 is adapted to perform or to facilitate any one of a number of RF-over-fiber applications, such as radio-frequency identification (RFID), wireless local area network (WLAN) communication, or cellular phone service. Shown within the picocell 40 is a device 45. The device 45 may be an object to be tracked which includes a tag 46 adapted to receive and/or send electromagnetic RF signals.

Figure 2:
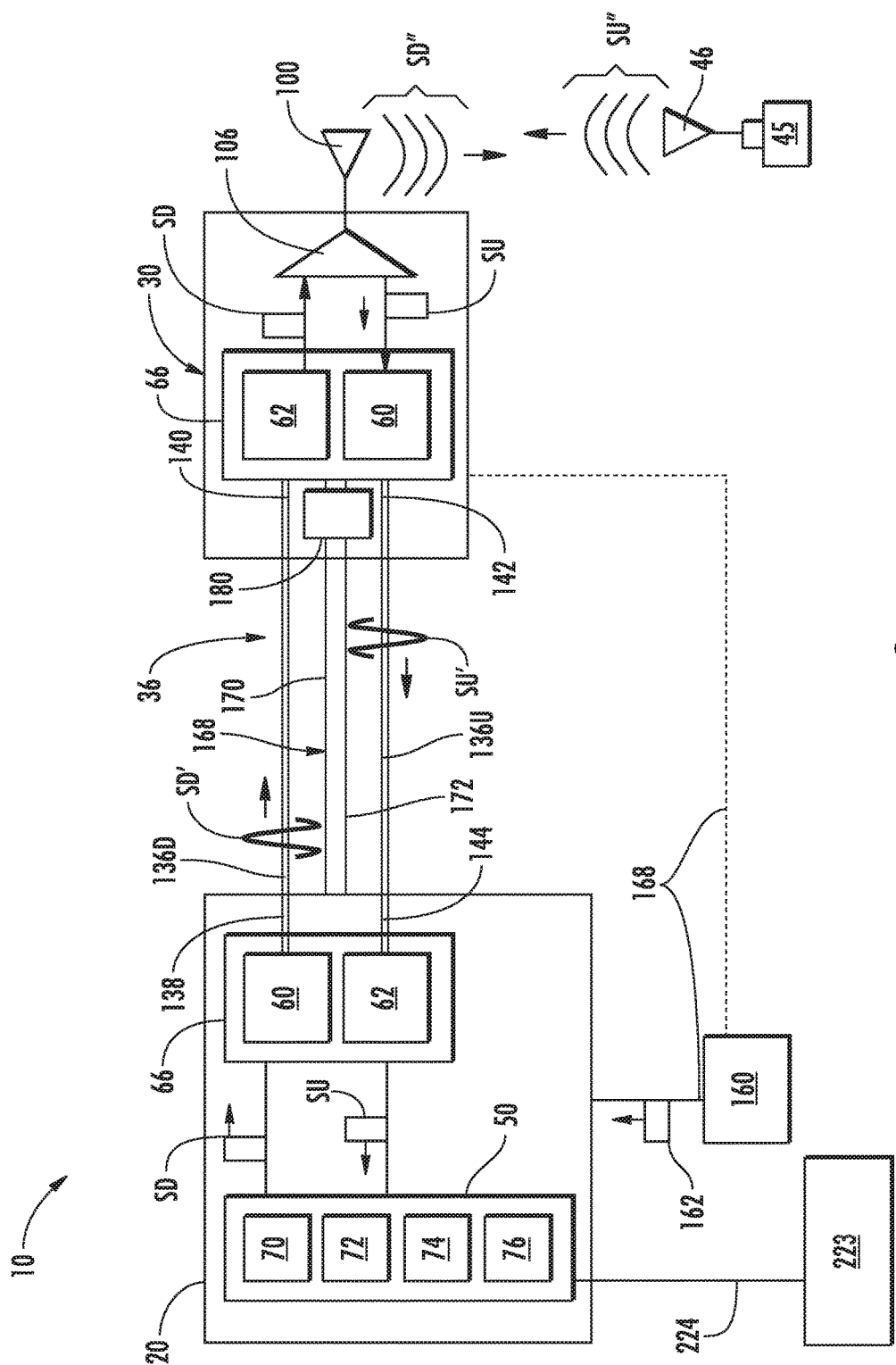
FIG. 2 is a more detailed schematic diagram of an exemplary embodiment of the system of FIG. 1.

FIG. 2 is a schematic diagram of an exemplary embodiment of the system 10 of FIG. 1. In this exemplary embodiment, the head-end unit 20 includes a service unit 50 that provides electrical RF service signals for a particular wireless service or application. The service unit 50 provides electrical RF service signals by passing (or conditioning and then passing) such signals from one or more outside networks 223, as described below. In a particular embodiment, this may include providing UWB-IR signal distribution in the range of 3.1 to 10.6 GHz. Other signal distribution is also possible, including WLAN signal distribution as specified in the IEEE 802.11 standard, i.e., in the frequency range from 2.4 to 2.5 GHz and from 5.0 to 6.0 GHz. In another embodiment, the service unit 50 may provide electrical RF service signals by generating the signals directly.

The service unit 50 is electrically coupled to an E/O converter 60 that receives an electrical RF service signal from the service unit 50 and converts it to corresponding optical signal, as discussed in further detail below. In an exemplary embodiment, the E/O converter 60 includes a laser suitable for delivering sufficient dynamic range for the RF-over-fiber applications, and optionally includes a laser driver/amplifier electrically coupled to the laser. Examples of suitable lasers for the E/O converter 60 include laser diodes, distributed feedback (DFB) lasers, Fabry-Perot (FP) lasers, and vertical cavity surface emitting lasers (VCSELs).

The head-end unit 20 also includes an O/E converter 62 electrically coupled to the service unit 50. The O/E converter 62 receives an optical RF service signal and converts it to a corresponding electrical signal. In one embodiment, the O/E converter is a photodetector, or a photodetector electrically coupled to a linear amplifier. The E/O converter 60 and the O/E converter 62 constitute a "converter pair" 66.

In an exemplary embodiment, the service unit 50 includes a RF signal modulator/demodulator unit 70 that generates an RF carrier of a given frequency and then modulates RF signals onto the carrier. The modulator/demodulator unit 70 also demodulates received RF signals. The service unit 50 also includes a digital signal processing unit ("digital signal processor") 72, a central processing unit (CPU) 74 for processing data and otherwise performing logic and computing operations, and a memory unit 76 for storing data, such as system settings, status information, RFID tag information, etc. In an exemplary embodiment, the different frequencies associated with the different signal channels are created by the modulator/demodulator unit 70 generating different RF carrier frequencies based on instructions from the CPU 74. Also, as described below, the common frequencies associated with a particular combined picocell are created by the modulator/demodulator unit 70 generating the same RF carrier frequency.

With continuing reference to FIG. 2, in one embodiment, a reference unit 30 includes a converter pair 66, wherein the E/O converter 60 and the O/E converter 62 therein are electrically coupled to an antenna system 100 via a RF signal-directing element 106, such as a circulator. The RF signal-directing element 106 serves to direct the downlink and uplink electrical RF service signals, as discussed below. In an exemplary embodiment, the antenna system 100 includes a broadband (3.1 to 10.6 GHz) antenna integrated into a specialized fiber-optic array cable, as shown and discussed below with reference to FIGS. 3A and 3B.

The reference units 30 differ from the typical access point device associated with wireless communication systems in that the preferred embodiment of the reference unit 30 has just a few signal-conditioning elements and no digital information processing capability. Rather, the information processing capability is located remotely in head-end unit 20, and in a particular example, in service unit 50. This allows reference unit 30 to be very compact and virtually maintenance free. In addition, the preferred exemplary embodiment of the reference unit 30 consumes very little power, is transparent to RF signals, and does not require a local power source, as described below.

With reference again to FIG. 2, an exemplary embodiment of the optical fiber RF communication link 36 includes a downlink optical fiber 136D having an input end 138 and an output end 140, and an uplink optical fiber 136U having an input end 142 and an output end 144. The downlink and uplink optical fibers 136D and 136U optically couple converter pair 66 at head-end unit 20 to the converter pair 66 at reference unit 30. Specifically, the downlink optical fiber input end 138 is optically coupled to the E/O converter 60 of the head-end unit 20, while the output end 140 is optically coupled to the O/E converter 62 at the reference unit 30. Similarly, the uplink optical fiber input end 142 is optically coupled to E/O converter 60 of the reference unit 30, while the output end 144 is optically coupled to the O/E converter 62 at the head-end unit 20.

In one embodiment, the system 10 employs a known telecommunications wavelength, such as 850 nm, 1300 nm, or 1550 nm. In another exemplary embodiment, the system 10 employs other less common but suitable wavelengths such as 980 nm.

Exemplary embodiments of the system 10 include either single-mode optical fiber or multimode optical fiber for downlink and the uplink optical fibers 136D and 136U. The particular type of optical fiber depends on the application of the system 10. For many in-building deployment applications, maximum transmission distances typically do not exceed 300 meters. The maximum length for the intended RF-over-fiber transmission needs to be taken into account when considering using multi-mode optical fibers for the downlink and uplink optical fibers 136D and 136U. For example, it has been shown that a 1400 MHz/km multi-mode fiber bandwidth-distance product is sufficient for 5.2 GHz transmission up to 300 m.

In one embodiment, a 50 μm multi-mode optical fiber is used for the downlink and uplink optical fibers 136D and 136U, and the E/O converters 60 operate at 850 nm using commercially available VCSELs specified for 10 Gb/s data transmission. In a more specific exemplary embodiment, OM3 50 μm multi-mode optical fiber is used for the downlink and uplink optical fibers 136D and 136U.

System 10 also includes a power supply 160 that generates an electrical power signal 162. The power supply 160 is electrically coupled to the head-end unit 20 for powering the power-consuming elements therein. In one embodiment, an electrical power line 168 runs through the head-end unit 20 and over to the reference unit 30 to power the E/O converter 60 and the O/E converter 62 in the converter pair 66, the optional RF signal-directing element 106 (unless element 106 is a passive device such as a circulator), and any other power-consuming elements (not shown). In an exemplary embodiment, the electrical power line 168 includes two wires 170 and 172 that carry a single voltage and that are electrically coupled to a DC power converter 180 at the reference unit 30. DC power converter 180 is electrically coupled to the E/O converter 60 and the O/E converter 62, and changes the voltage or levels of the electrical power signal 162 to the power level(s) required by the power-consuming components in the reference unit 30. In one embodiment, the DC power converter 180 is either a DC/DC power converter, or an AC/DC power converter, depending on the type of electrical power signal 162 carried by the electrical power line 168. In an exemplary embodiment, the electrical power line 168 includes standard electrical-power-carrying electrical wire(s), e.g., 18-26 AWG (American Wire Gauge) used in standard telecommunications and other applications. In another exemplary embodiment, the electrical power line 168 (dashed line) runs directly from the power supply 160 to the reference unit 30 rather than from or through the head-end unit 20. In another exemplary embodiment, the electrical power line 168 includes more than two wires and carries multiple voltages.

In another embodiment, the head-end unit 20 is operably coupled to an outside network 223 via a network link 224.

With reference to the optical-fiber-based wireless pico-cellular system 10 of FIG. 1 and FIG. 2, the service unit 50 generates an electrical downlink RF service signal SD ("electrical signal SD") corresponding to its particular application. In one embodiment, this is accomplished by the digital signal processor 72 providing the modulator/de-modulator unit 70 with an electrical signal (not shown) that is modulated onto a RF carrier to generate a desired electrical signal SD. The electrical signal SD is received by the E/O converter 60, which converts this electrical signal SD into a corresponding optical downlink RF signal SD' ("optical signal SD'"), which is then coupled into downlink optical fiber 136D at the input end 138. It is noted here that in one embodiment the optical signal SD' is tailored to have a given modulation index. Further, in an exemplary embodiment the modulation power of the E/O converter 60 is controlled (e.g., by one or more gain-control amplifiers, not shown) to vary the transmission power from the antenna system 100. In an exemplary embodiment, the amount of power provided to the antenna system 100 is varied to define the size of the associated picocell 40, which in exemplary embodiments range anywhere from about a meter across to about twenty meters across.

The optical signal SD' travels over the downlink optical fiber 136D to the output end 140, where it is received by the O/E converter 62 in reference unit 30. The O/E converter 62 converts the optical signal SD' back into electrical signal SD, which then travels to the signal-directing element 106. The signal-directing element 106 then directs the electrical signal SD to the antenna system 100. The electrical signal SD is fed to the antenna system 100, causing it to radiate a corresponding electromagnetic downlink RF signal SD" ("electromagnetic signal SD'''").

When the device 45 is an object to be tracked and is located within the picocell 40, the electromagnetic signal SD" is received by the tag 46. The tag 46 may be a RFID tag, a sensor, or part of a wireless card, or a cell phone antenna, for example. The tag 46 converts the electromagnetic signal SD" into an electrical signal SD in the device 45, and processes the electrical signal SD. The tag 46 can generate electrical uplink RF signals SU, which are converted into electromagnetic uplink RF signals SU" ("electromagnetic signal SU'''") by an antenna associated with tag 46.

When the device 45 is an object to be tracked and is located within the picocell 40, the electromagnetic signal SU" is detected by the antenna system 100 in the reference unit 30, which converts this signal back into an electrical signal SU. The electrical signal SU is directed by the signal-directing element 106 to the E/O converter 60, which converts this electrical signal into a corresponding optical uplink RF signal SU' ("optical signal SU'''"), which is then coupled into the input end 142 of the uplink optical fiber 136U. The optical signal SU' travels over the uplink optical fiber 136U to the output end 144, where it is received by the O/E converter 62 at the head-end unit 20. The O/E converter 62 converts the optical signal SU' back into electrical signal SU, which is then directed to the service unit 50. The service unit 50 receives and processes electrical signal SU, which in one embodiment includes one or more of the following: storing the signal information; digitally processing or conditioning the signals; sending the signals on to one or more outside networks 223 via network links 224; and sending the signals to one or more devices 45 in the picocellular coverage area 44. In an exemplary embodiment, the processing of electrical signal SU includes demodulating the electrical signal SU in the modulator/demodulator unit 70, and then processing the demodulated signal in the digital signal processor 72.

Figure 3A:
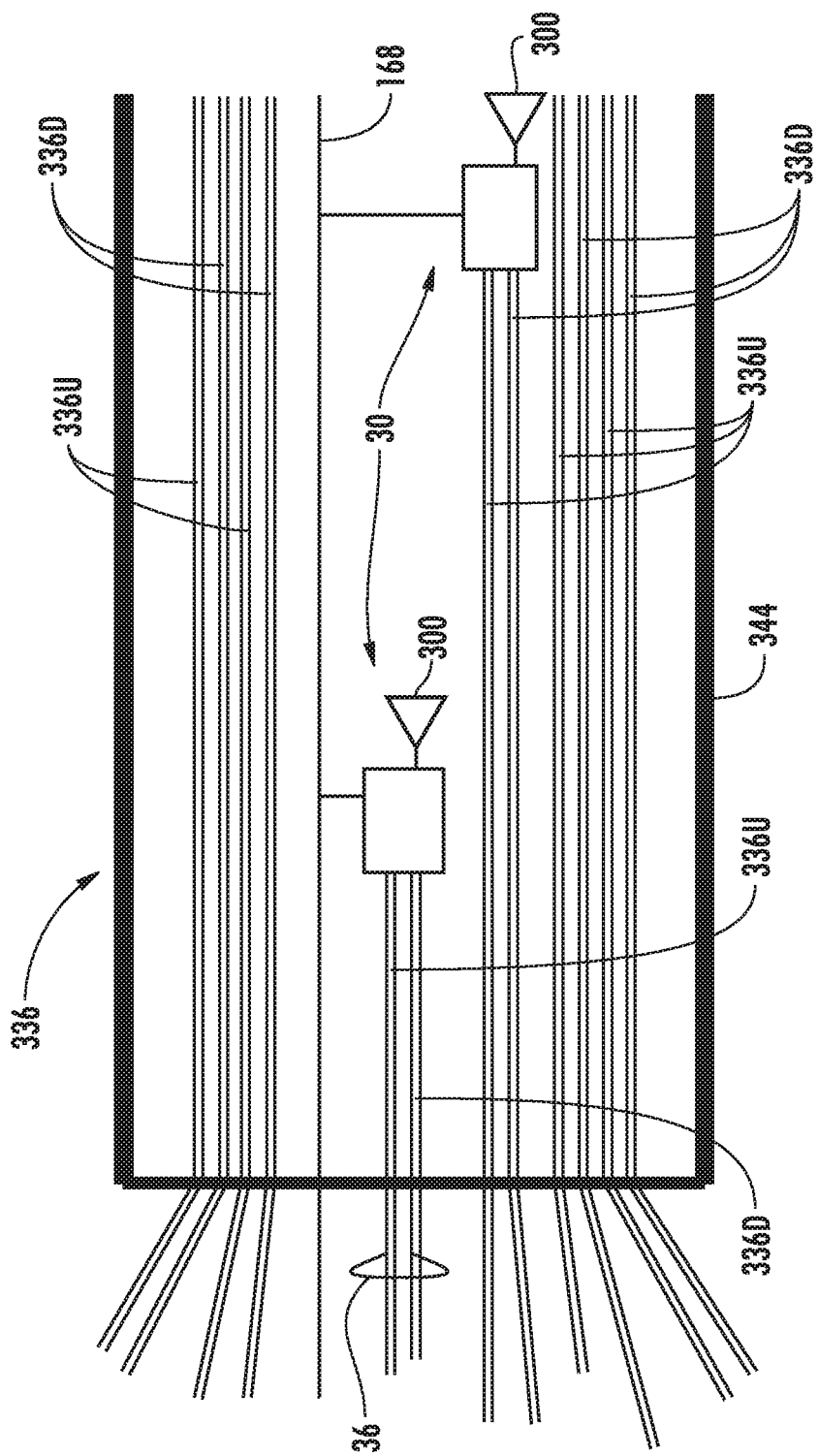
FIG. 3A is a close-up schematic diagram of an exemplary fiber optic array cable according to one embodiment.

FIG. 3A is a close-up schematic diagram of an exemplary fiber optic array cable 336 that may be used in conjunction with the optical-fiber-based wireless picocellular system 10. Fiber optic array cable 336 includes a downlink optical fiber 336D and an uplink optical fiber 336U that extend along the length of the fiber optic array cable 336. At various points along the fiber optic array cable 336 are reference units 30. Two reference units 30 are shown, but any number may be used. The reference units 30 may be evenly spaced along the fiber optic array cable 336, but they need not be. In a preferred embodiment, the reference units 30 are placed 4 meters apart. The reference units 30 include E/O and O/E conversion capability, which may be implemented by a converter pair like converter pair 66 in FIG. 2. Each reference unit 30 has at least one broadband antenna 300. The broadband antenna 300 is adapted to send and receive UWB signals in the range of 3.1 to 10.6 GHz. Also shown is the electrical power line 168 electrically coupled to the reference units 30.

In an exemplary embodiment, the fiber optic array cable 336 includes a protective outer jacket 344. In an exemplary embodiment, the reference units 30 reside completely within the outer jacket 344. FIG. 3B is a schematic diagram similar to FIG. 3A, illustrating an exemplary embodiment wherein the reference units 30 lie outside of protective outer jacket 344. Locating the reference units 30 outside of the protective outer jacket 344 may make it easier to arrange the reference units relative to a building infrastructure after the optical fiber cable is deployed, as described below.

Alternately, the reference units 30 may be provided in a tether cable (not shown) that is connected to the fiber optic array cable 336.

Figure 4:
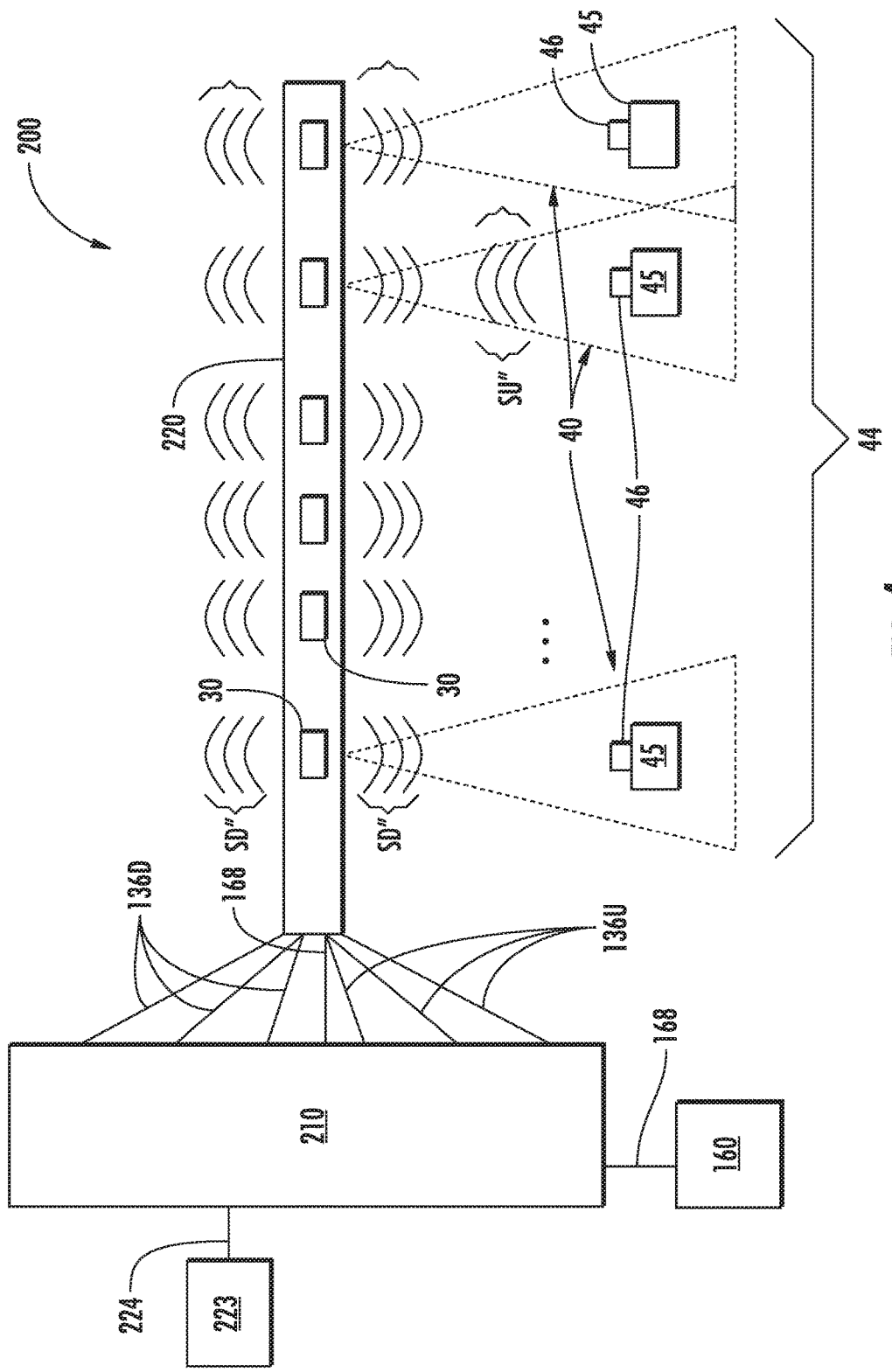
FIG. 4 is a schematic diagram of an exemplary embodiment of an optical-fiber-based wireless picocellular system that includes a central head-end station.

FIG. 4 is a schematic diagram of an exemplary embodiment of an optical-fiber-based wireless picocellular system 200 that includes a central head-end station 210. The central head-end station 210 can be thought of as a head-end unit 20 adapted to handle one or more service units 50 and one or more reference units 30. Central head-end station 210 is optically coupled to an optical fiber cable 220 that includes multiple reference units 30. The optical fiber cable 220 is constituted by multiple optical fiber RF communication links 36 (FIG. 2), with each link optically coupled to a corresponding reference unit 30. In one embodiment, multiple reference units 30 are spaced apart along the length of the optical fiber cable 220 (e.g., at 4 or 8 meter intervals in exemplary embodiments) to create a desired picocellular coverage area 44 comprised of picocells 40, which may overlap at their edges.

Figure 5:
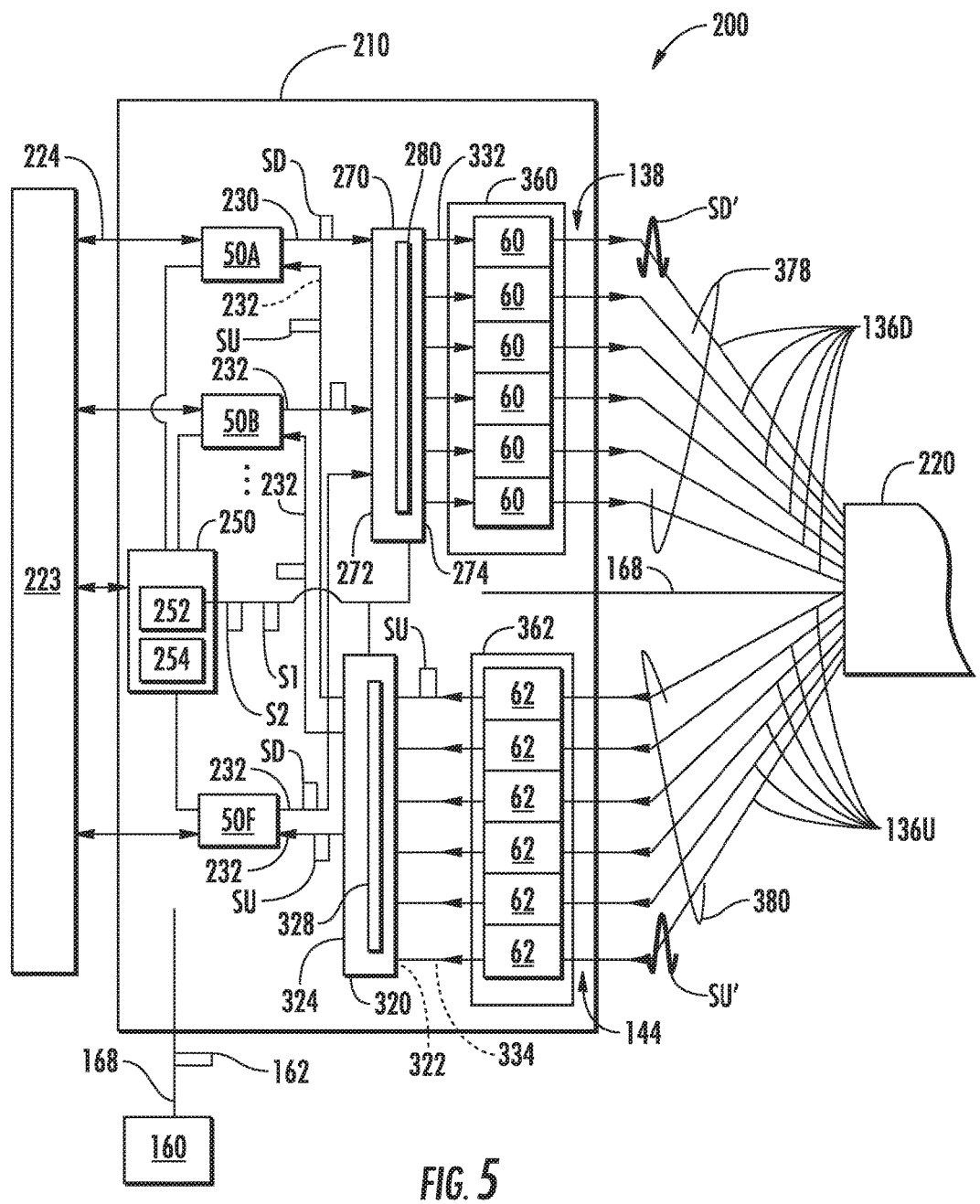
FIG. 5 is a detailed schematic diagram of an exemplary embodiment of a central head-end station.

FIG. 5 is a detailed schematic diagram of an exemplary embodiment of the central head-end station 210. Rather than including multiple head-end units 20 of FIG. 1 directly into central head-end station 210, in an exemplary embodiment the head-end units 20 are modified to allow for each service unit 50 to communicate with one, some, or all of the reference units 30, depending on the particular application of a given service unit 50. The service units 50 are each electrically coupled to a RF transmission line 230 and a RF receiving line 232. In FIG. 5, only three of six service units 50A through 50F are shown for the purposes of clarifying the illustration.

In one embodiment, the system 200 further includes a main controller 250 operably coupled to the service units 50 and adapted to control and coordinate the operation of the service units 50 in communicating with the reference units 30. In an exemplary embodiment, the main controller 250 includes a CPU 252 and a memory unit 254 for storing data. The CPU 252 is adapted (e.g., is programmed) to process information provided to the main controller 250 by one or more of service units 50. In an exemplary embodiment, the main controller 250 is or includes a programmable computer adapted to carry out instructions (programs) provided to it or otherwise encoded therein on a computer-readable medium.

The central head-end station 210 further includes a downlink RF signal multiplexer ("downlink multiplexer") 270 operably coupled to the main controller 250. The downlink multiplexer 270 has an input side 272 and an output side 274. RF transmission lines 230 are electrically connected to the downlink multiplexer 270 at the input side 272.

In an exemplary embodiment, the downlink multiplexer 270 includes a RF signal-directing element 280 (e.g., a RF switch) that allows for selective communication between the service units 50 and the reference units 30, as described below. In an example, the selective communication involves sequentially addressing reference units 30 for polling corresponding picocells 40. Such sequential polling may be used, for example, when one of the service units 50 is a RFID reader searching for RFID tags 46 in picocells 40 (FIG. 4). In an exemplary embodiment, the tags 46 are attached to device 45 if device 45 is an item to be tracked or otherwise monitored via the attached tag 46. In another exemplary embodiment, the selective communication involves simultaneously addressing some or all of the reference units 30. Such simultaneous addressing can be used, for example, when one of the service units 50 is a cellular phone transmitter or a RF-signal feed-through unit that provides simultaneous coverage of some or all of the picocells 40.

The central head-end station 210 also includes an uplink RF signal multiplexer ("uplink multiplexer") 320 operably coupled to the main controller 250 and having an input side 322 and an output side 324. Receiving lines 232 are electrically connected to the uplink multiplexer 320 at the output side 324. In an exemplary embodiment, the uplink multiplexer 320 includes a RF signal-directing element 328.

The central head-end station 210 also includes a number of E/O converters 60 that make up an E/O converter array 360, and a corresponding number of O/E converters 62 that make up an O/E converter array 362. The E/O converters 60 are electrically coupled to the output side 274 of downlink multiplexer 270 via electrical lines 332, and are optically coupled to the input ends 138 of corresponding downlink optical fibers 136D. The O/E converters 62 are electrically coupled to the input side 322 of the uplink multiplexer 320 via the electrical lines 334, and are optically coupled to the output ends 144 of the corresponding uplink optical fiber 136U. The downlink optical fibers 136D constitute a downlink optical fiber cable 378 and the uplink optical fibers 136U constitute an uplink optical fiber cable 380.

With reference to FIGS. 3A, 3B, 4, and 5, the optical-fiber-based wireless picocellular system 200 operates as follows. At the central head-end station 210, the service units 50A, 50B, . . . 50F each generate or pass through from one or more outside networks 223 respective electrical signals SD that correspond to the particular application of the given service unit. The electrical signals SD are transmitted over the RF transmission lines 230 to the downlink multiplexer 270. The downlink multiplexer 270 then combines (in frequency) and distributes the various electrical signals SD to the E/O converters 60 in the E/O converter array 360. In an exemplary embodiment, the downlink multiplexer 270 and RF signal-directing element 280 therein are controlled by the main controller 250 via a control signal 51 to the direct electrical signals SD to one, some, or all of the E/O converters 60 in the E/O converter array 360 and thus to one, some or all of the reference units 30, based on the particular service unit application. For example, if service unit 50A is a cellular phone unit, then in an exemplary embodiment the electrical signals SD therefrom (e.g., passing therethrough from one or more outside networks 223) are divided (and optionally amplified) equally by the RF signal-directing element 280 and provided to each E/O converter 60 in E/O converter array 360. This results in each reference unit 30 being addressed. On the other hand, if the service unit 50F is a WLAN service unit, then RF signal-directing element 280 may be adapted (e.g., programmed) to direct electrical signals SD to select ones of the E/O converters 60 in E/O converter array 360 so that only select reference units 30 are addressed.

Thus, one, some, or all of the E/O converters 60 in the E/O converter array 360 receive the electrical signals SD from the downlink multiplexer 270. The addressed E/O converters 60 in the E/O converter array 360 convert the electrical signals SD into corresponding optical signals SD', which are transmitted over the corresponding downlink optical fibers 136D to the corresponding reference units 30. The addressed reference units 30 convert the optical signals SD' back into electrical signals SD, which are then converted into electromagnetic signals SD" that correspond to the particular service unit application.

Figure 6:
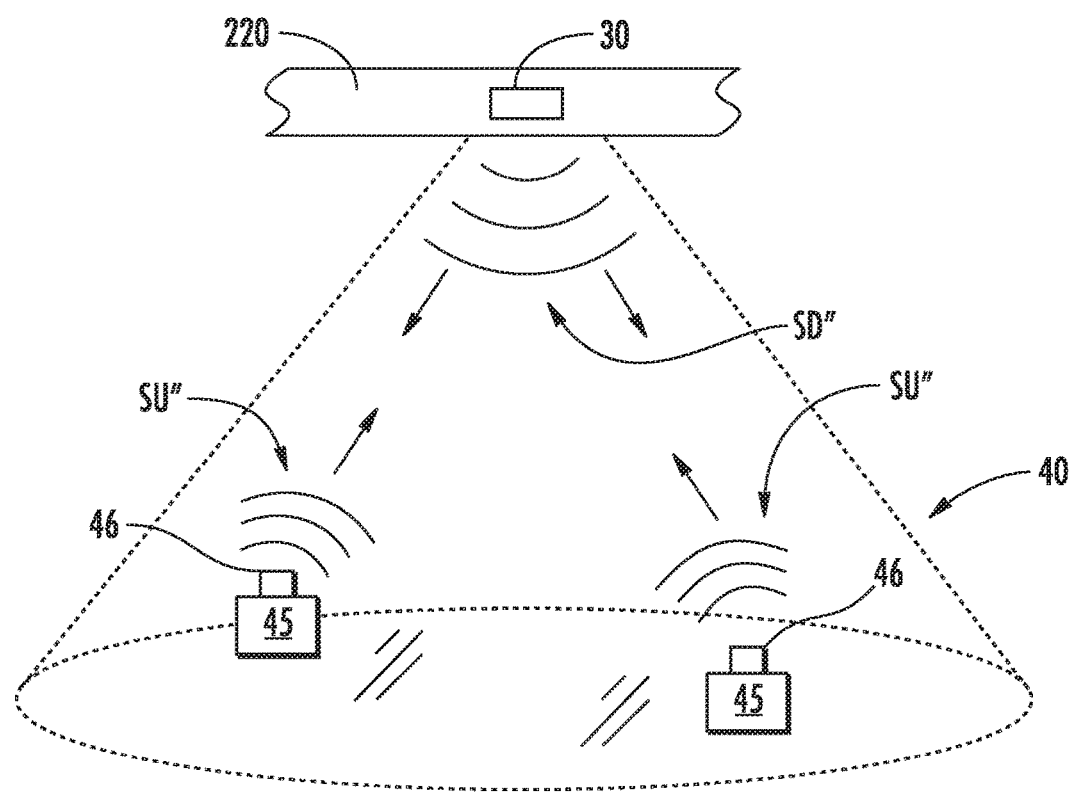
FIG. 6 is a view of one example of a reference unit located in a fiber optic array cable, illustrating a corresponding picocell and the exchange of downlink and uplink electromagnetic signals between the reference unit and objects within the picocell.

FIG. 6 is a close-up view of one of the reference units 30, illustrating the corresponding picocell 40 and the exchange of downlink and uplink electromagnetic signals SD" and SU" between the reference units 30 and the devices 45 within the picocell 40. In particular, the electromagnetic signals SU" are received by the corresponding reference unit 30 and converted to electrical signals SU, and then to optical signals SU'. The optical signals SU' then travel over the uplink optical fiber 136U and are received by the O/E converter array 362 and the corresponding O/E converters 62 therein for the addressed reference units 30. The O/E converters 62 convert the optical signals SU' back to electrical signals SU, which then proceed to the uplink multiplexer 320. The uplink multiplexer 320 then distributes the electrical signals SU to the service unit(s) 50 that require(s) receiving these electrical signals SU. The receiving service units 50 process the electrical signals SU, which in an exemplary embodiment includes one or more of: storing the signal information; digitally processing or conditioning the signals; sending the signals on to one or more outside networks 223 via the network links 224; and sending the signals to one or more devices 45 in the picocellular coverage area 44.

In an exemplary embodiment, the uplink multiplexer 320 and the RF signal-directing element 328 therein are controlled by the main controller 250 via a control signal S2 (see FIG. 5) to direct electrical signals SU to the service unit(s) 50 that require(s) receiving electrical signals SU. Different services from some or all of the service units 50 (i.e., cellular service, WiFi for data communication, RFID monitoring, etc.) may be combined at the RF signal level by frequency multiplexing.

In an exemplary embodiment, a single electrical power line 168 from the power supply 160 at central head-end station 210 is incorporated into the optical fiber cable 220 and is adapted to power each reference unit 30, as shown in FIGS. 3A and 3B. Each reference unit 30 taps off the needed amount of power, e.g., via a DC power converter 180 (FIG. 2). Since the preferred embodiment of a reference unit 30 has relatively low functionality and power consumption, only relatively low electrical power levels are required (e.g., ~1 watt), allowing high-gauge wires to be used (e.g., 20 AWG or higher) for the electrical power line 168. In an exemplary embodiment that uses many reference units 30 (e.g., more than twelve) in the optical fiber cable 220, or if the power consumption for the reference units 30 is significantly larger than 1 watt due to their particular design, lower-gauge wires or multiple wires are employed in the electrical power line 168. The inevitable voltage drop along the electrical power line 168 within the optical fiber cable 220 typically requires large-range (~30 volts) voltage regulation at each reference unit 30. In an exemplary embodiment, DC power converters 180 at each reference unit 30 perform this voltage regulation function. If the expected voltage drop is known, then in an exemplary embodiment the main controller 250 carries out the voltage regulation. In an alternative embodiment, remote voltage sensing at each reference unit 30 is used, but this approach is not the preferred one because it adds complexity to the system.

Figure 7:
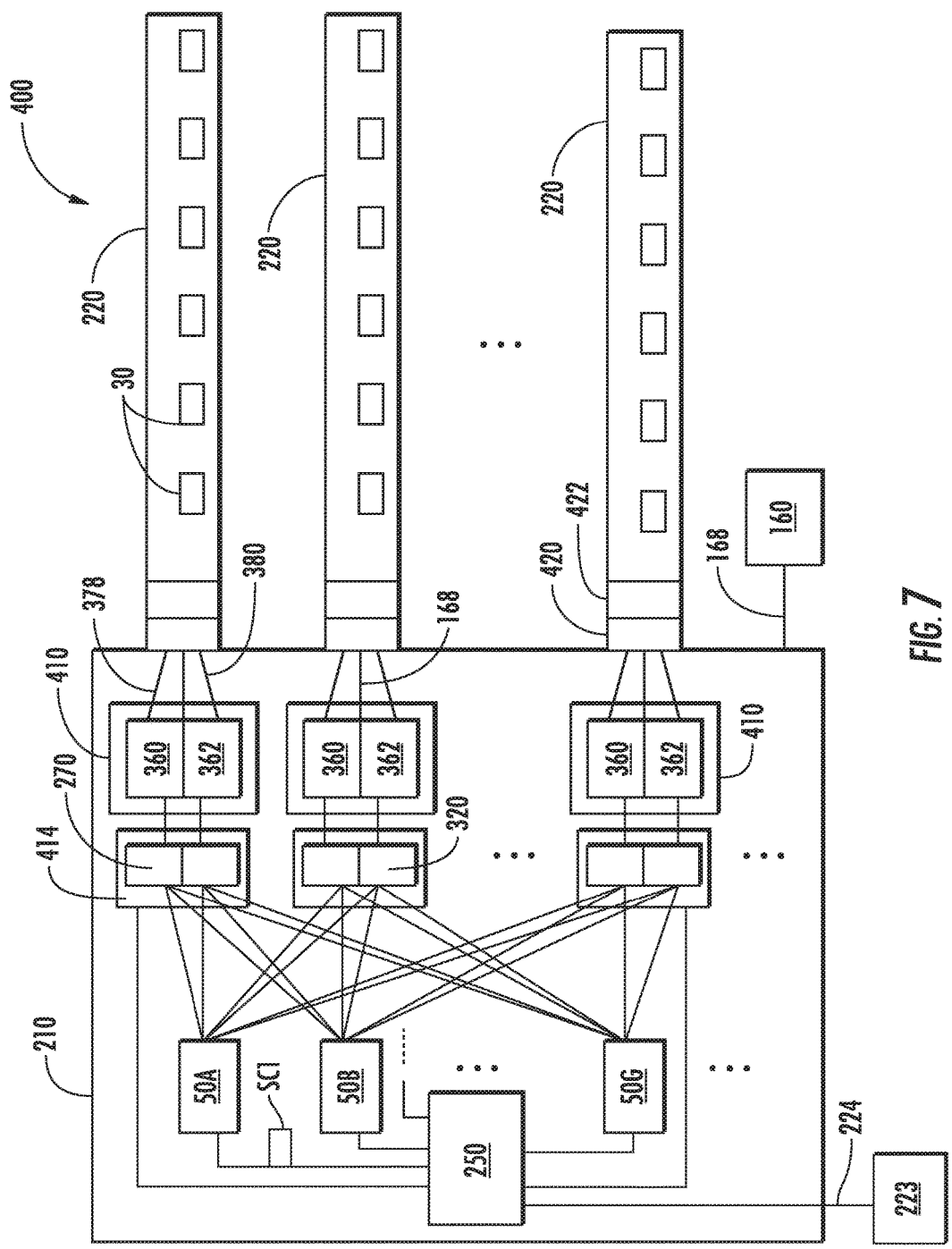
FIG. 7 is a schematic diagram of an exemplary embodiment of a centralized optical-fiber-based wireless picocellular system that includes multiple optical fiber cables optically coupled to the central head-end station.

FIG. 7 is a schematic diagram of an exemplary embodiment of a centralized optical-fiber-based wireless picocellular system 400. The system 400 is similar to the system 200 as described above, but includes multiple optical fiber cables 220 optically coupled to the central head-end station 210. The central head-end station 210 includes a number of E/O converter arrays 360 and a corresponding number of O/E converter arrays 362, arranged in pairs in converter array units 410, with one converter array unit 410 optically coupled to one optical fiber cable 220. Likewise, the system 400 includes a number of downlink multiplexers 270 and uplink multiplexers 320, arranged in pairs in multiplexer units 414, with one multiplexer unit 414 electrically coupled to one converter array unit 410. In an exemplary embodiment, the main controller 250 is electrically coupled to each multiplexer unit 414 and is adapted to control the operation of the downlink and uplink multiplexers 270 and 320 therein. Here, the term "array" is not intended to be limited to components integrated onto a single chip as is often done in the art, but includes an arrangement of discrete, non-integrated components.

Each E/O converter array 360 is electrically coupled to the downlink multiplexer 270 in the corresponding multiplexer unit 414. Likewise, each O/E converter array 362 is electrically coupled to the uplink multiplexer 320 in the corresponding multiplexer unit 414. The service units 50 are each electrically coupled to both downlink and uplink multiplexers 270 and 320 within each multiplexer unit 414. Respective downlink and uplink optical fiber cables 378 and 380 optically couple each converter array unit 410 to a corresponding optical fiber cable 220. In an exemplary embodiment, the central head-end station 210 includes connector ports 420 and optical fiber cables 220 include connectors 422 adapted to connect to the connector ports 420. In an exemplary embodiment, the connectors 422 are MT ("Mechanical Transfer") connectors, such as the UNI-CAM® MTP connector available from Corning Cable Systems, Inc., Hickory, N.C. In an exemplary embodiment, the connectors 422 are adapted to accommodate the electrical power line 168 connected to the connector ports 420.

Figure 8:
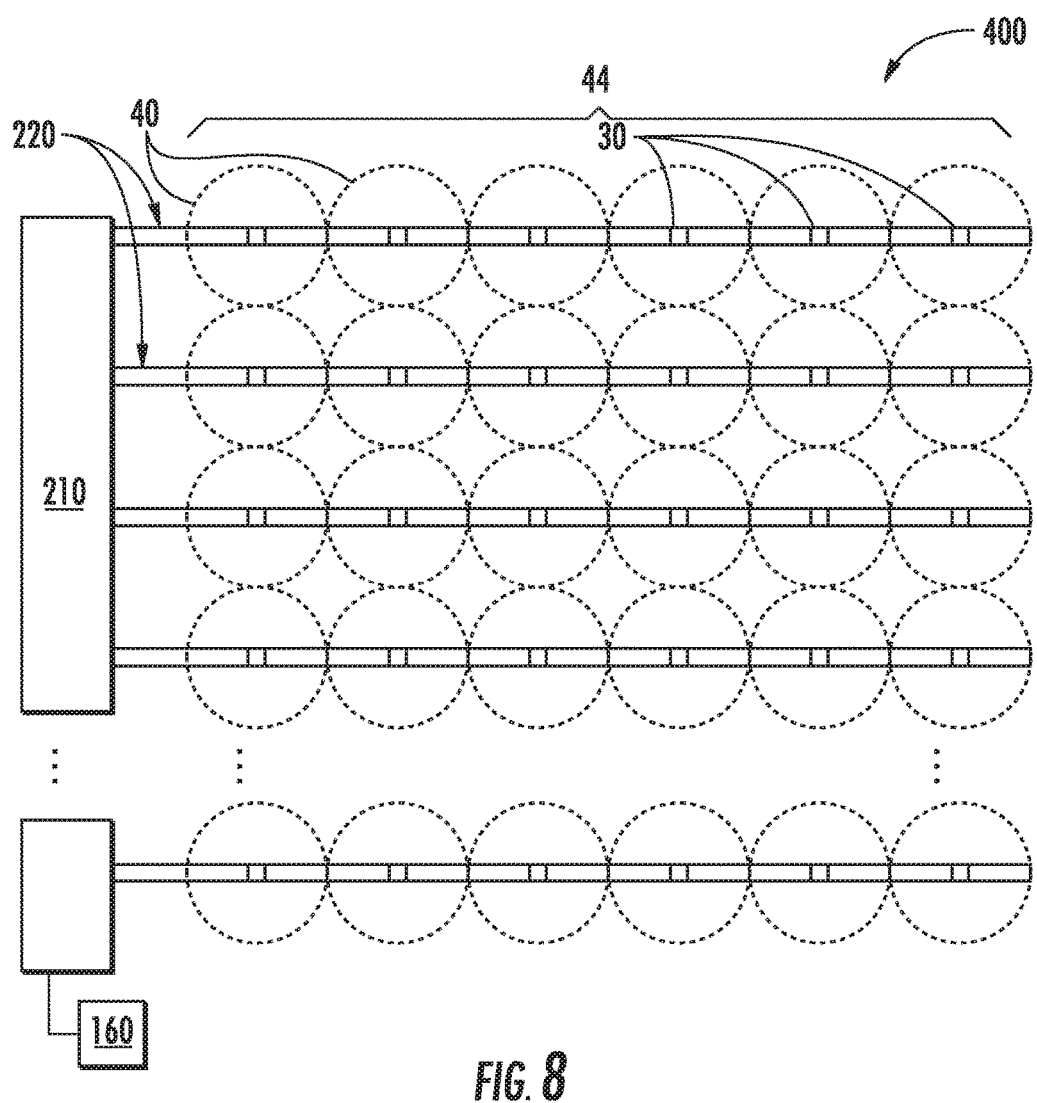
FIG. 8 is a "top down" view of the system of FIG. 7, showing an exemplary extended picocellular coverage area formed by using multiple optical fiber cables.

FIG. 8 is a "top down" view of the system 400, showing an extended picocellular coverage area 44 formed by using multiple optical fiber cables 220. In an exemplary embodiment, the system 400 supports anywhere from two reference units 30, to hundreds of reference units 30, to even thousands of reference units 30. The particular number of reference units 30 employed is not fundamentally limited by the design of the system 400, but rather by the particular application.

In FIG. 8, the picocells 40 are shown as non-overlapping. This non-overlap is based on adjacent reference units 30 operating at slightly different frequencies to avoid the otherwise undesirable substantial overlap that occurs between adjacent picocells 40 that operate at the same frequency.

System 400 operates in a manner similar to the system 200 as described above, except that instead of reference units 30 being in a single optical fiber cable 220, the reference units 30 are distributed over two or more optical fiber cables 220 through the use of corresponding two or more converter array units 410. Electrical signals SD from the service units 50 are distributed to each multiplexer unit 414. The downlink multiplexers 270 therein convey electrical signals SD to one, some, or all of the converter array units 410, depending on which reference units 30 are to be addressed by which service unit 50. Electrical signals SD are then processed as described above, with downlink optical signals SD' being sent to one, some, or all of reference units 30. Uplink optical signals SU' generated by devices in the corresponding picocells 40 return to the corresponding converter array units 410 at the central head-end station 210. The optical signals SU' are converted to electrical signals SU at the receiving converter array unit(s) 410 and are then sent to the uplink multiplexers 320 in the corresponding multiplexer unit(s) 414. The uplink multiplexers 320 therein are adapted (e.g., programmed by main controller 250) to direct electrical signals SU to the service unit(s) 50 that require(s) receiving electrical signals SU. The receiving service units 50 process the electrical signals SU, which as discussed above in an exemplary embodiment includes one or more of: storing the signal information; digitally processing or conditioning the signals; sending the signals on to one or more outside networks 223 via network links 224; and sending the signals to one or more client devices 45 in the picocellular coverage area 44.

Figure 9:
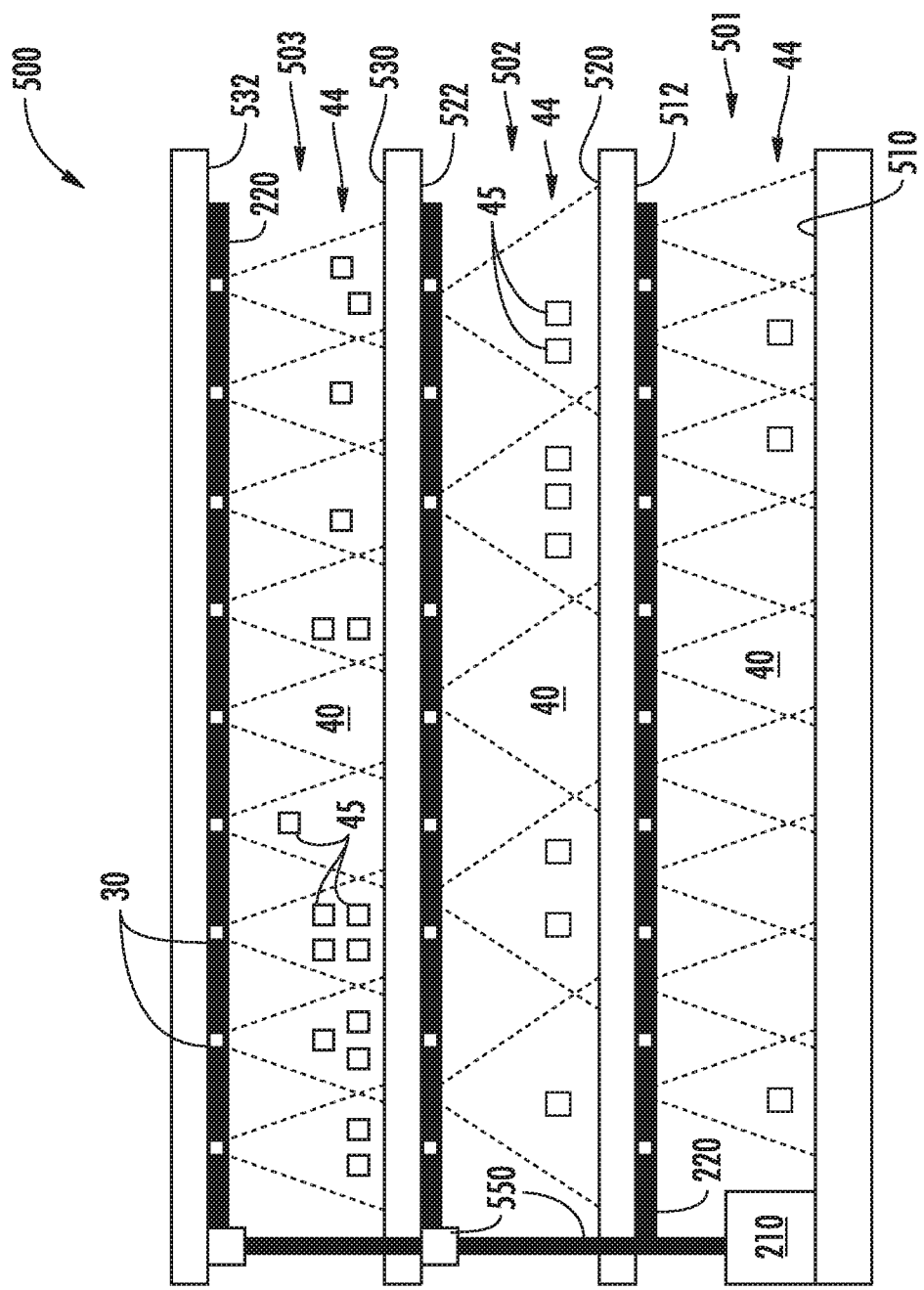
FIG. 9 is a schematic cut-away diagram of an exemplary building infrastructure in which an exemplary optical-fiber-based wireless picocellular system might be used.

FIG. 9 is a schematic cut-away diagram of a building infrastructure 500 that generally represents any type of building in which the optical-fiber-based wireless picocellular system would be useful, such as office buildings, schools, hospitals, college buildings, airports, warehouses, etc. The building infrastructure 500 includes a first (ground) floor 501, a second floor 502, and a third floor 503. The first floor 501 is defined by a floor 510 and a ceiling 512; the second floor 502 is defined by a floor 520 and a ceiling 522; and the third floor 503 is defined by a floor 530 and a ceiling 532. An exemplary centralized optical-fiber-based wireless picocellular system, such as system 400, is incorporated into building infrastructure 500 to provide a picocellular coverage area 44 that covers floors 501, 502, and 503.

Figure 10:
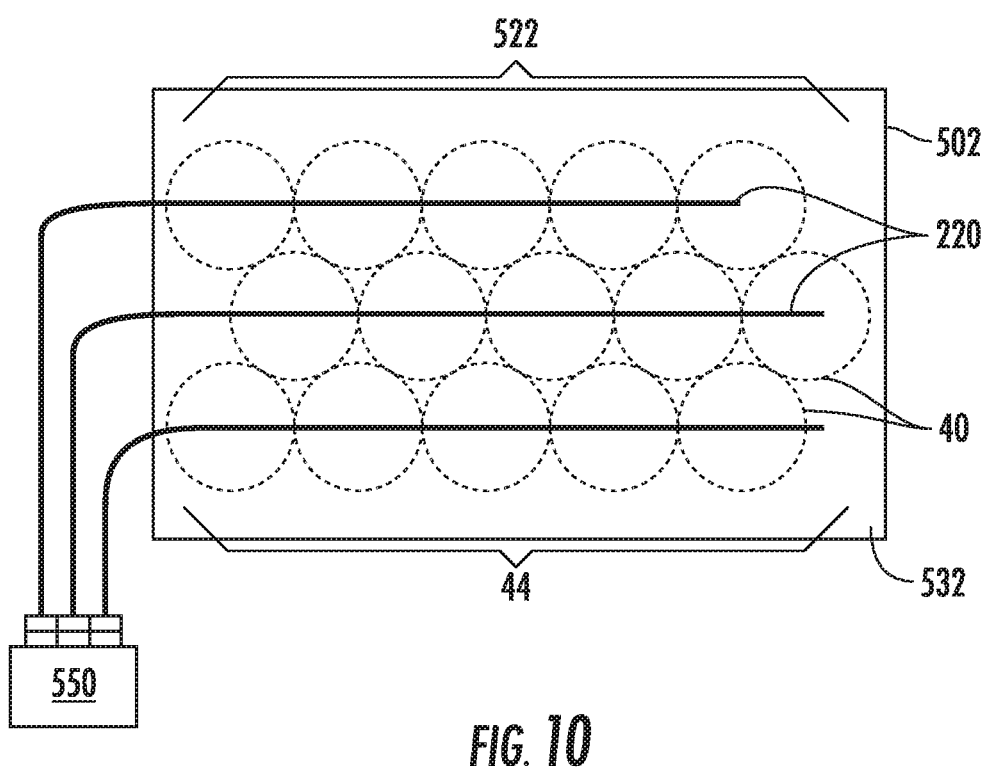
FIG. 10 is a schematic "top down" view of one floor of the building infrastructure of FIG. 9, showing multiple fiber optic array cables extending over the ceiling of the floor of the building.

An exemplary embodiment involves tailoring or designing the picocellular coverage areas 44 for the different floors 501, 502, and 503 to suit particular needs. FIG. 10 is a schematic "top down" view of the second floor 502 of the building infrastructure 500, showing three optical fiber cables 220 branching out from the MC connector 550 and extending over the ceiling 522. The picocells 40 associated with reference units 30 (not shown in FIG. 10) form an extended picocellular coverage area 44 that covers the second floor 502 with fewer, larger picocells than the first and third floors 501 and 503 (FIG. 9). Such different picocellular coverage areas 44 may be desirable when the different floors have different wireless needs. For example, the third floor 503 might require relatively dense picocell coverage if it serves as storage for items that need to be inventoried and tracked via RFID tags 46. Likewise, the second floor 502 may be office space that calls for larger and fewer picocells to provide cellular phone service and WLAN coverage.

One application of picocellular wireless systems, including the optical-fiber-based wireless picocellular system 200, as shown in FIGS. 4 and 5, or the optical-fiber-based wireless picocellular system 400, as shown in FIGS. 7 and 8, that may comprise a fiber optical array cable 336 as shown in FIGS. 3A and 3B, involves providing a number of different services (e.g., WLAN, voice, RFID tracking, temperature, and/or light control) within a building, usually by deploying one or more optical fiber cables close to the ceiling. For example, ultrawideband (UWB) radios can have relative bandwidths larger than twenty percent (20%) or absolute bandwidths of more than 500 MHz, which offer advantages for communication applications. In particular, UWB-IR technology offers the advantage of providing accurate ranging information, which results from the inherent narrow time signature of broadband pulses. Thus, while not limiting, UWB-IR technology may be used for target sensor data collection, precision locating, and tracking of objects. UWB refers to signals which spread across many frequency bands that are allocated to different purposes. Thus, its use involves co-existence and electromagnetic compatibility (EMC) considerations. As per Federal Communications Commission (FCC) regulations, the Effective Isotropic Radiated Power (EIRP) of these devices is restricted to less than −41.3 dBm/MHz. The low EIRP makes UWB technology attractive in environments (e.g., hospitals) where electromagnetic interference could cause device malfunctions. However, this EIRP restriction also imposes significant limitations on the range of operation of these signals when compared to traditional 802.11 Wireless Local Area Network (WLAN) technology. Another issue with UWB-IR is that it requires multiple Line of Sight (LoS) signals to provide accurate range information.

According to one embodiment disclosed herein, UWB-IR signals are transmitted over a centralized RoF system of the type discussed above that includes one or more of the fiber optic reference array cables disclosed herein. The accurate ranging capability of UWB-IR systems does not deteriorate when UWB-IR signals are transmitted over a centralized RoF system. Thus, by transmitting UWB-IR signals over a centralized RoF system that includes a fiber optic reference array cable with multiple reference units, accurate and reliable three dimensional tracking of a target object in environments, including indoor environments, can be enabled.

Figure 11:
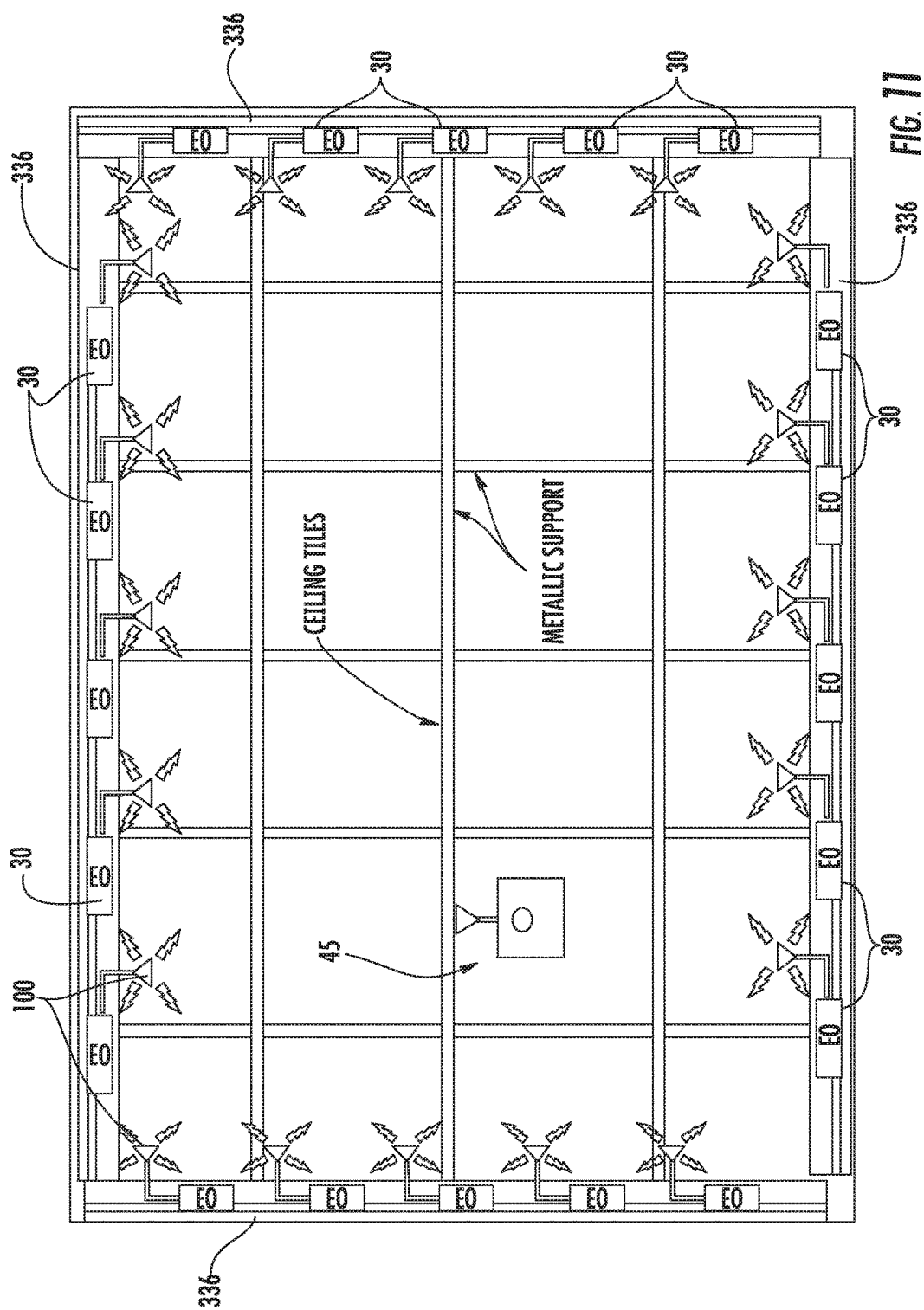
FIG. 11 is a schematic view of an exemplary deployment of four fiber optic reference array cables on top of ceiling tiles to provide three-dimensional location tracking.

FIG. 11 is a schematic view of an exemplary deployment of four fiber optic array cables 336 on top of ceiling tiles to provide three-dimensional location tracking, according to one embodiment. Each fiber optic array cable 336 has multiple reference units 30 that include at least one E/O and O/E converter pair 66 and at least one antenna 100. In a preferred embodiment, the antenna 100 is an UWB-IR antenna adapted to send and receive UWB signals in the range of 3.1 to 10.6 GHz. The number of fiber optic array cables 336 and the pattern in which the fiber optic array cables 336 are arranged is not critical. However, it is beneficial if there are enough reference units 30 in the fiber optic array cables 336 to avoid blocking-induced loss of tracking.

Figure 12:
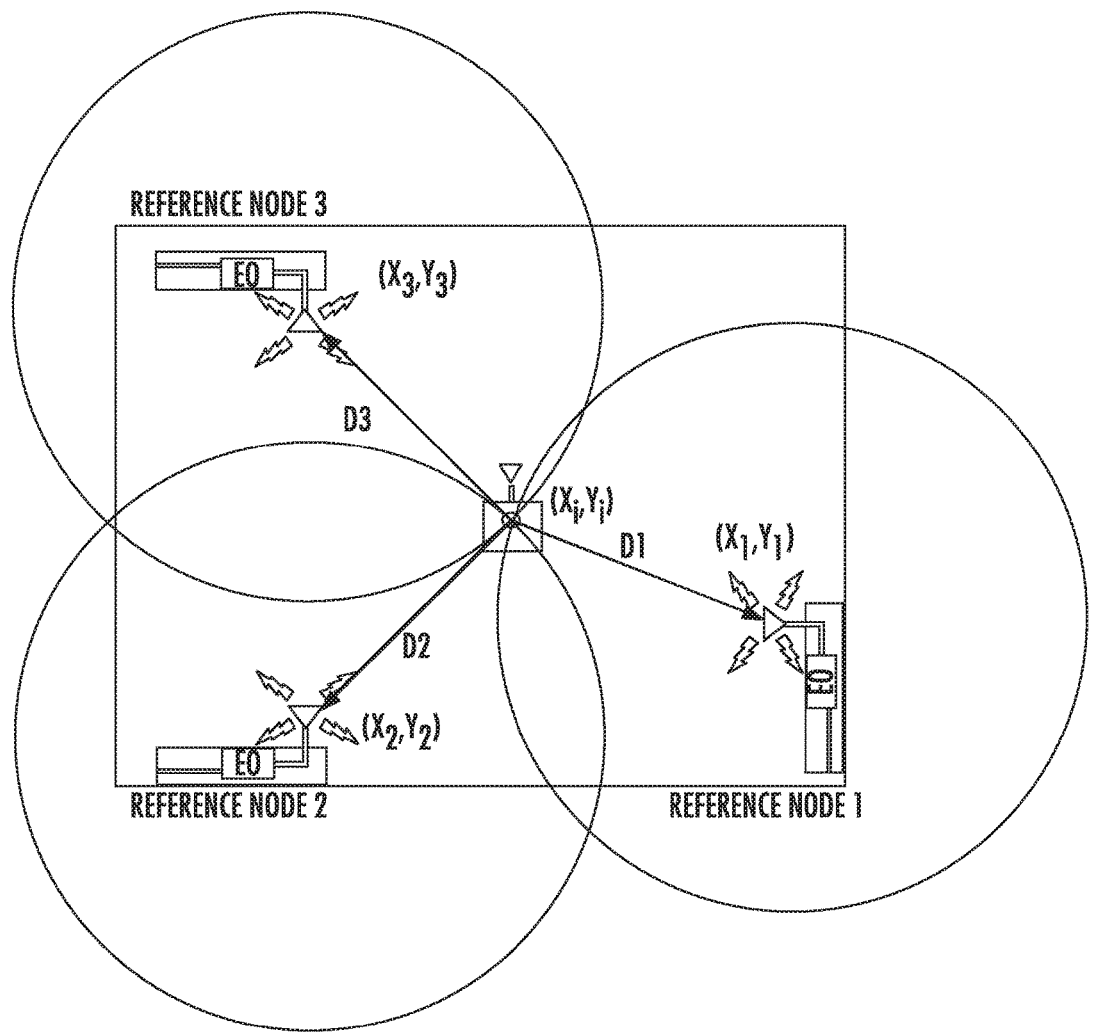
FIG. 12 illustrates a two-dimensional location tracking system using three reference nodes.

FIG. 12 illustrates a prior art two-dimensional location tracking system using three reference nodes. FIG. 12 shows two dimensional tracking with the help of three reference nodes. The location of the object can be obtained by using a time of arrival based algorithm, which includes solving the following equation for ($x_i$, $y_i$).

$$2\begin{bmatrix} (x3-x1) & (y3-y1) \\ (x3-x2) & (y3-y2) \end{bmatrix}\begin{bmatrix} xi \\ yi \end{bmatrix} = \begin{bmatrix} D1^2 - D3^2 - x1^2 - y1^2 + x3^2 + y3^2 \\ D2^2 - D3^2 - x2^2 - y2^2 + x3^2 + y3^2 \end{bmatrix}$$

To perform the time of arrival based algorithm, one would need at least three reference nodes for doing tracking in two dimensions, and would need four reference nodes in order to do tracking in three dimensions. Moreover, if one of the reference nodes is blocked, such as by a wall or other obstacle, the location finding algorithm becomes unstable.

Figure 13:
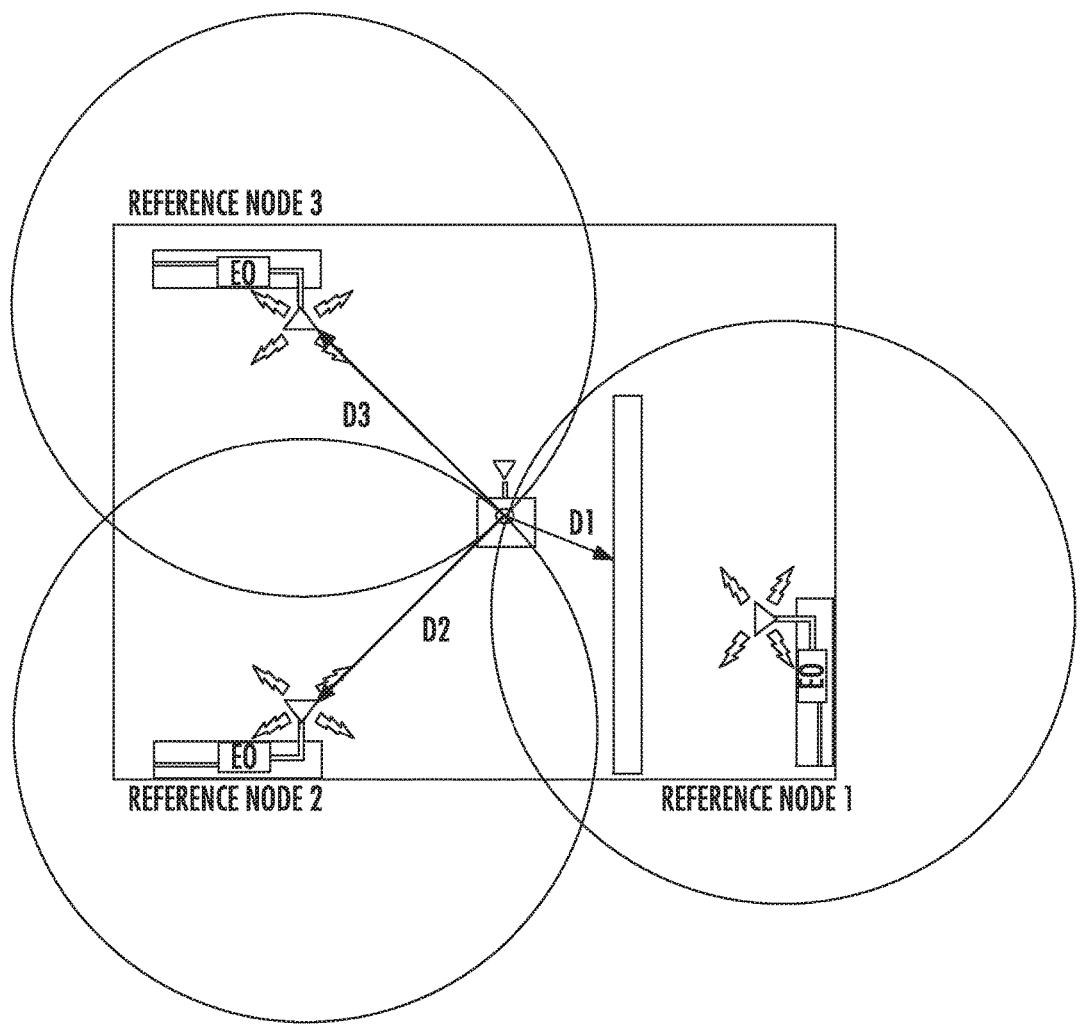
FIG. 13 illustrates how a two-dimensional location tracking system using three reference nodes fails when three lines of sight are not available.

FIG. 13 illustrates how a prior art two-dimensional location tracking system using three reference nodes fails when three lines of sight are not available.

To avoid this problem, one or more fiber optic array cables 336 with multiple reference units 30 are used to provide a reference array, as shown in FIG. 11. Having the availability of the extra reference units 30 of the fiber optic array cables 336 of FIG. 11 provides enhanced reliability in tracking objects in an indoor environment. The optical-fiber-based wireless picocellular system includes a central head-end station 210 (see FIGS. 4, 5, 19A, 19B, 20, and 21) to provide management of the system to provide enhanced tracking by selecting one or more reference units 30 from each fiber optic array cable 336 using a switch, which in various exemplary embodiments may be a 1×N optical switch or a RF switch. In the event of a tracking algorithm failure due to a blocking situation of the type shown in the prior art system of FIG. 12, the switch could be activated to switch to another reference unit combination in the fiber optic array cables 336 to mitigate the blocking-induced loss of tracking. The multiple reference units 30 of the fiber optic array cables 336 significantly increase the probability to have line of sight (LoS) paths to the object being tracked.

Figure 20:
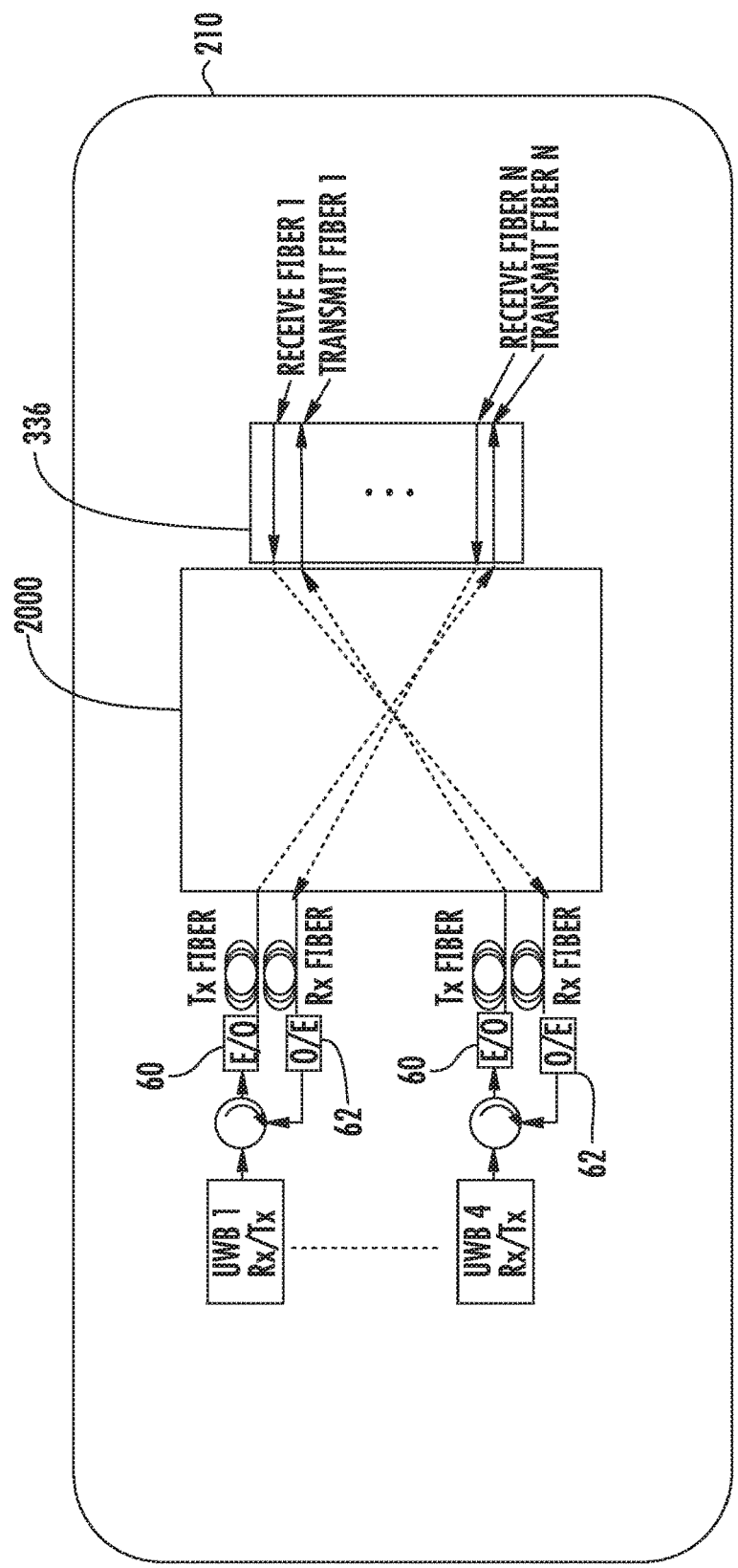
FIG. 20 is a schematic diagram showing the details of an exemplary head-end unit that enables the use of different sections of a single fiber optic array cable for three-dimensional tracking of objects.

The installation of the fiber optic array cables 336 with multiple reference units 30, as shown in FIG. 11, also has the advantage of being simple. Four fiber optic array cables 336 can be laid on top of the ceiling tiles, as shown in FIG. 11, in most buildings. It is also possible to lay a single fiber optic array cable 336 with at least four reference units 30 that include an E/O and O/E converter pair 66 and an antenna 100, and then use optical switches in the central head-end station 210, as shown in FIG. 20.

The availability of the multiple reference units 30 in the fiber optic array cables 336 would also provide more than two equations to solve for (xi, yi), which results in more stable three-dimensional location tracking. By using the accurate ranging UWB-IR signals over a centralized RoF wireless system that includes the fiber optic array cables 336, a more efficient system of location tracking of objects is provided.

Figure 14:
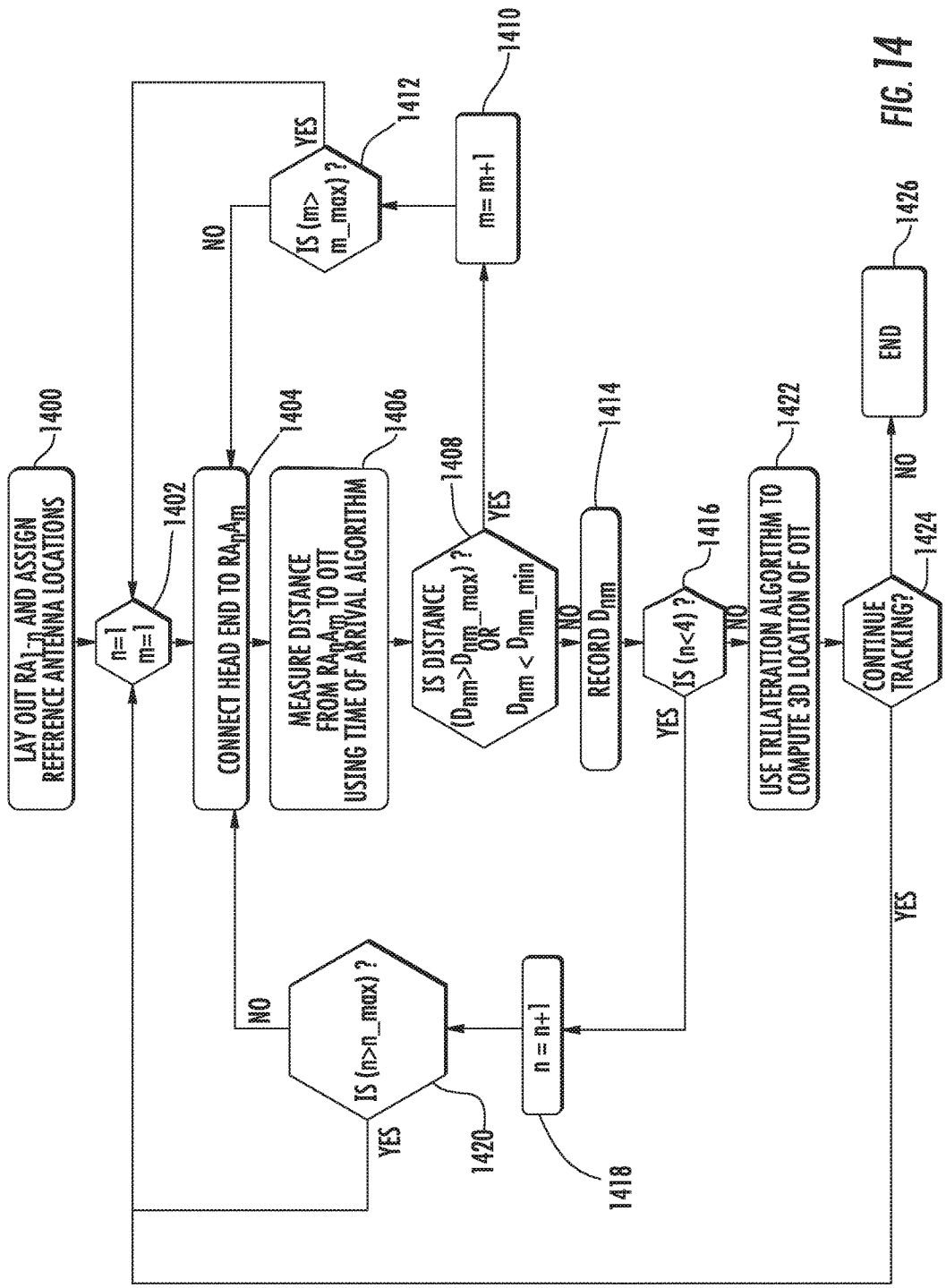
FIG. 14 is a flow chart showing the steps of an exemplary method of tracking the location of objects using an exemplary fiber optic reference array cable system.

FIG. 14 is a flow chart showing the steps of an exemplary method of tracking the location of objects using an exemplary fiber optic array cable system, such as the one shown in FIG. 11.

The fiber optic array cables 336 are laid out as shown in FIG. 11 and locations of the reference antennas 100 are assigned (block 1400). The reference array may have n number of fiber optic array cables 336, with each fiber optic array cable 336 having m number of reference units 30 having an E/O and O/E converter pair 66 and an antenna 100 (with n and m both being any number). One particular reference unit 30 is designated as $RA_1A_1$ (block 1402) and that reference unit 30 is connected to the central head-end unit 210 (block 1404).

As discussed above with respect to FIGS. 3A, 3B, 4, and 5, a service unit 50 at the central head-end station 210 will generate or pass through from one or more outside networks 223 an electrical signal SD that corresponds to the particular application of the given service unit 50. The electrical signal SD is then processed as discussed above to direct the electrical signal SD to the appropriate E/O converter 60 in the E/O converter array 360 and thus as an optical signal SD' to the selected reference unit 30 ($RA_1A_1$). This results in the selected reference unit 30 being addressed. The addressed reference unit 30 converts the optical signals SD' back into electrical signals SD. The electrical signal SD is fed to an antenna 100, causing it to radiate a corresponding signal SD". In one embodiment, the antenna 100 is configured to radiate a UWB signal. In an exemplary embodiment, the UWB signal is transmitted at a frequency between 3.1 and 10.6 GHz.

When the device 45 is an object to be tracked that is located within the picocell 40, a corresponding signal SD" (which may be an UWB signal) is received by the tag 46. The tag 46 may be a RFID tag, or other sensor, such as part of a wireless card, or a cell phone antenna. The tag 46 can generate electromagnetic uplink RF signals SU" (electromagnetic signal SU"'") in response to the received signal SD" from the antenna 100. In an exemplary embodiment, the device 45 may have an antenna (not shown) associated with tag 46 that generates the electromagnetic uplink RF signals SU".

When the device 45 is an object to be tracked and is located within the picocell 40, the electromagnetic signal SU" is detected by the antenna system 100 in the reference unit 30, which converts this signal back into an electrical signal SU. The electrical signal SU is directed by the signal-directing element 106 to the E/O converter 60, which converts this electrical signal into a corresponding optical signal SU' (which is then coupled into the input end 142 of the uplink optical fiber 136U. The optical signal SU' travels over the uplink optical fiber 136U to the output end 144, where it is received by the O/E converter 62 at the head-end unit 20. The O/E converter 62 converts the optical signal SU' back into electrical signal SU, which is then directed to the service unit 50. The service unit 50 receives and processes signal SU, which in this case is used to measure the distance from the object to be tracked (OTT) to the reference unit 30.

At block 1406, the distance from $RA_1A_1$ to the OTT is measured using the time of arrival algorithm as set forth above, or any known algorithm for measuring distance. However, the algorithm must compensate for a time of flight delay introduced by the RoF system. This can be easily calibrated out by knowing the length of the fiber pairs connected to each reference unit 30 on the fiber optic array cable 336.

At block 1408, the distance ($D_{nm}$) is then compared to a threshold distance $D_{nm\_min/max}$ to ensure that the measured distance is accurate. For example, the maximum threshold distance might be the dimensions of the room in which the fiber optic array cables 336 are located. If the measured distance is larger than the room dimensions, then the measured distance is deemed inaccurate and will not be used. One cause of an inaccurate measurement is that there is no LoS path from the selected reference unit 30 to the OTT due to a blocking obstacle. Another source of error may be cross talk with other signals. In the case of any inaccurate measurement, another reference unit (m+1) in the fiber optic array cable 336 is selected (block 1410) and a check is made at block 1412 (is m greater than the maximum number of reference units 30 in the fiber optic array cable 336) to make sure the end of the fiber optic array cable 336 has not been reached. The new reference unit ($RA_1A_2$) is connected to the central head-end station 210. Blocks 1406 and 1408 are then repeated for the new reference unit.

If the measured distance ($D_{nm}$) is not greater than the maximum threshold distance $D_{nm\_max}$, then the distance $D_{nm}$ is recorded at block 1414. A decision as to whether a reference unit 30 in each of the four fiber optic array cables 336 has been selected (is n<4) is then performed at block 1416. Although the number of fiber optic array cables 336 in FIG. 11 is four, the number may be less or more than four, although at least four is preferred to do three-dimensional tracking of objects. If n is less than four in the example method of FIG. 14, then a different fiber optic array cable 336 is selected (n=n+1) at block 1418 as long as a maximum number of fiber optic arrays 336 has not been reached (block 1420). Blocks 1404 through 1414 are then repeated until four or more distances have been measured. The three-dimensional location of the OTT is then determined or calculated using a known trilateration algorithm. One can use a similar equation as discussed above, but with three variables (x, y, z), which requires using four measured distances from the OTT to the four reference units 30 in the fiber optic array cable(s) 336. In one embodiment, one reference unit 30 from each of the four fiber optic array cables 336 can be selected, and then the four measured distances can be used to solve for the three-dimensional location of the object (xi, yi, zi). A decision is then made at block 1424 as to whether tracking is to be continued, and if so, then the process starts over at block 1402. If not, the tracking process ends at block 1426.

Having the availability of the extra reference units 30 of the fiber optic array cables 336 provides enhanced reliability in tracking objects in an indoor environment by providing more LoS paths. The availability of the multiple reference units 30 in the fiber optic array cables 336 would also provide more than two equations to solve for the location of the object, which results in more stable three-dimensional location tracking.

In addition, since there may be multiple unused reference units 30 on the fiber optic array cables 336, it is also possible to track multiple objects at the same time using the same infrastructure.

Moreover, since the UWB-IR antennas are broadband and cover most of the 802.11 bands, the reference units 30 on the fiber optic array cables 336 can also be used for other wireless services in addition to tracking objects.

Figure 15:
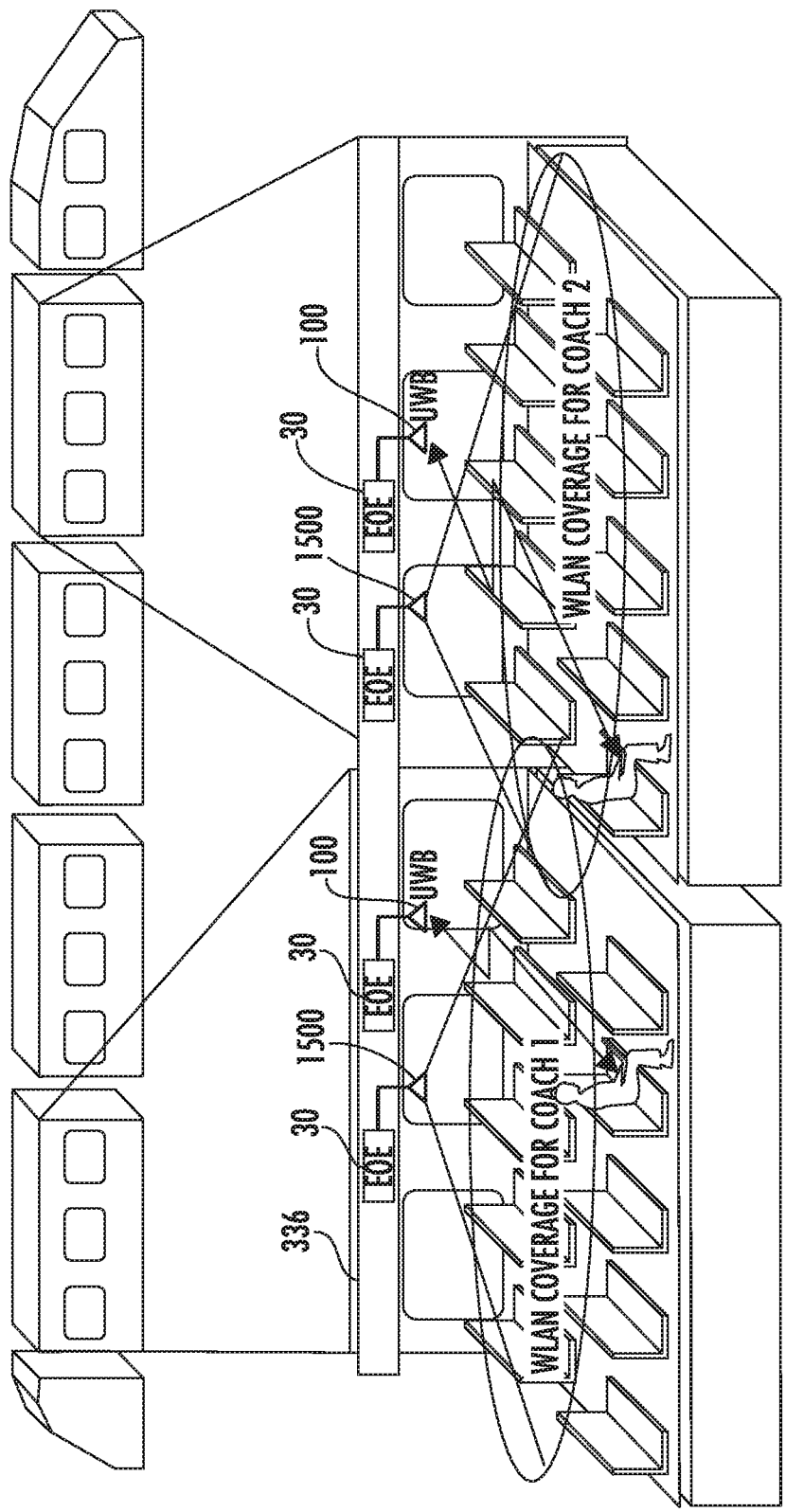
FIG. 15 is a schematic view of an exemplary deployment of a fiber optic array cable system in a train.

For example, FIG. 15 is a schematic view of an exemplary deployment of a fiber optic array cable 336 in a train where there is a WLAN access point 1500. The fiber optic array cable 336 employing the UWB-IR antennas 100 at the reference units 30 can be used as discussed above with respect to FIG. 14 to determine the distance a user is from a known WLAN access point 1500. Knowing the distance, the central head-end station 210 can dynamically assign a stable WLAN access point 1500. The assigned WLAN access point 1500 may be determined based on signal strength, according to applicable WLAN standards, and/or the determined or calculated distance. The WLAN can refuse to assign an access point based on the determined location, enabling data security. Real time ticket purchase with automatic seat recognition is also possible. By having the multiple reference units 30 in the fiber optic array cables 336, the distance can be determined or calculated even if there are passengers or other objects blocking the signals from the UWB-IR antennas. Multiple fiber optic array cables 336 can be used to provide more UWB-IR antennas to provide more accurate positioning. In one embodiment, the WLAN access point 1500 can also carry the UWB-IR signals.

Figure 16:
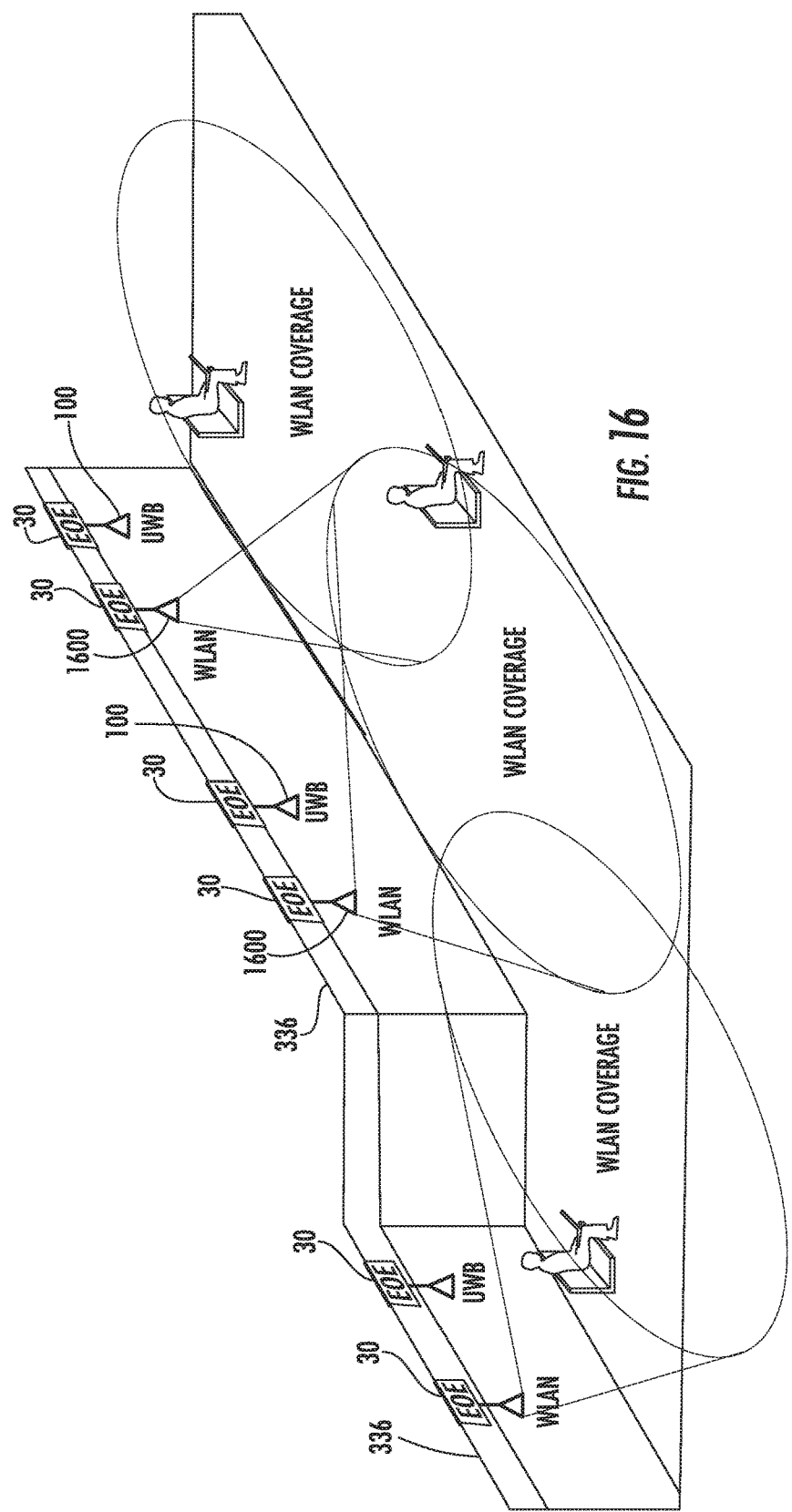
FIG. 16 is a schematic view of an exemplary deployment of a fiber optic array cable system in an indoor setting to determine the optimal WLAN access point for a user.

FIG. 16 is a schematic view of an exemplary deployment of a fiber optic array cable 336 in an indoor setting to determine an optimal WLAN access point for a user. In FIG. 16, one or more fiber optic array cables 336 having multiple UWB-IR antennas 100 are deployed in the ceiling of a building or other location. There are also multiple WLAN access points 1600 in the ceiling or located elsewhere in the building. The fiber optic array cable 336 employing the UWB-IR antennas 100 at the reference units 30 can be used as discussed above with respect to FIG. 14 to determine the distance a user is from a known WLAN access point 1600. Knowing the distance, the central head-end station 210 can dynamically assign the nearest WLAN access point 1600. If the determined location is outside the building, the connection to the WLAN can be prohibited, thereby providing data security. In one embodiment, the WLAN access point 1600 can also carry the UWB-IR signals.

Figure 17:
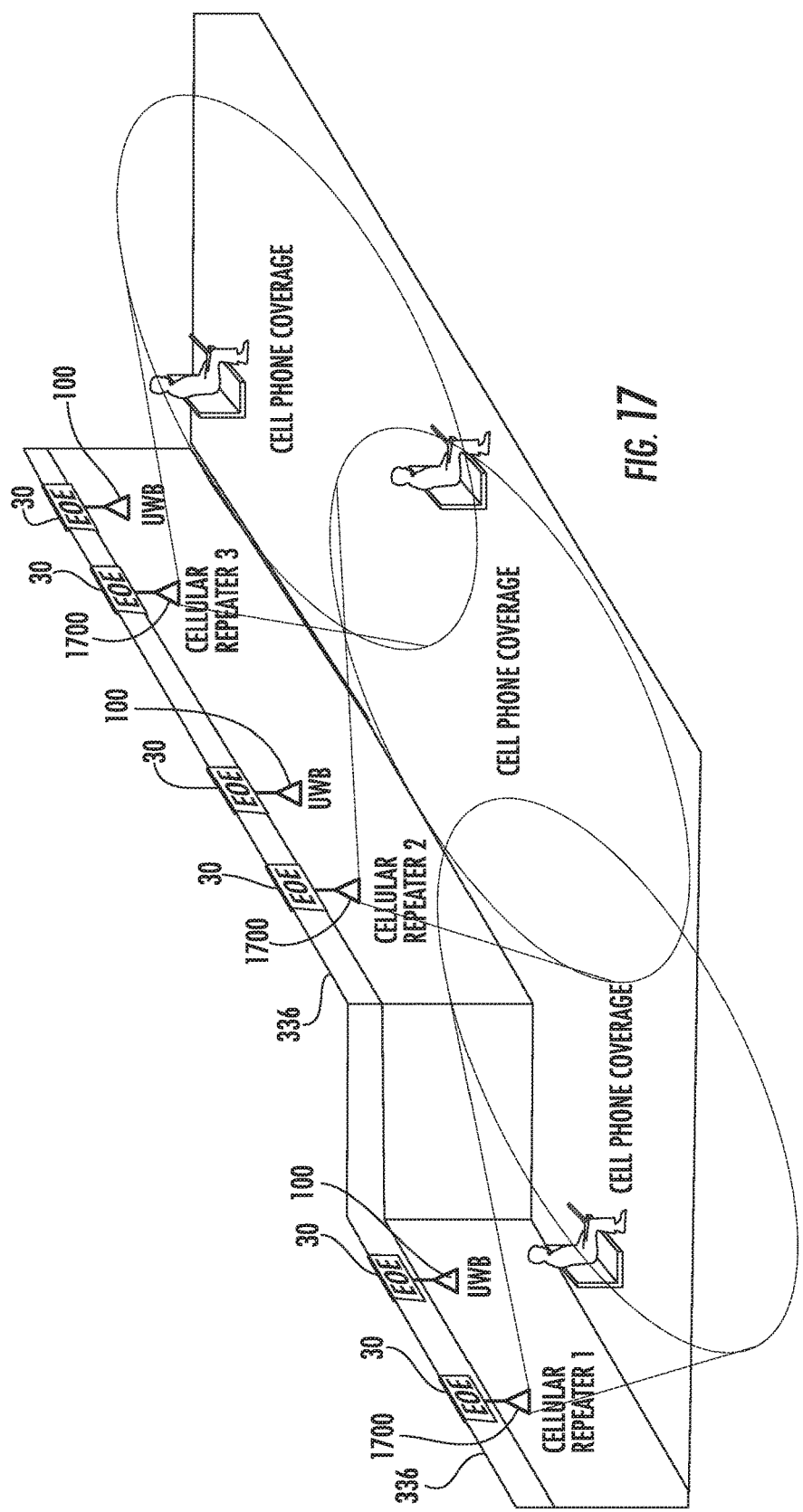
FIG. 17 is a schematic view of an exemplary deployment of a fiber optic array cable system in an indoor setting to help assist in placing and locating emergency 911 calls.

FIG. 17 is a schematic view of an exemplary deployment of a fiber optic array cable 336 in an indoor setting to help assist in placing and locating emergency 911 (E911) calls. In a typical indoor cellular distributed antenna system, E911 calls will provide information about the location of the building only. In FIG. 17, one or more fiber optic array cables 336 having multiple UWB-IR antennas 100 are deployed in the ceiling of a building or other location. There are also multiple cellular repeaters 1700 in the ceiling or located elsewhere in the building that provide cellular coverage. The fiber optic array cable 336 employing the UWB-IR antennas 100 at the reference units 30 can be used as discussed above with respect to FIG. 14 to determine the location of the user making the E911 call through the cellular network. Knowing the location allows more precise in-building location information which might not be otherwise possible with a cellular call. In one embodiment, the cellular repeaters 1700 can also carry the UWB-IR signals.

Figure 18B:
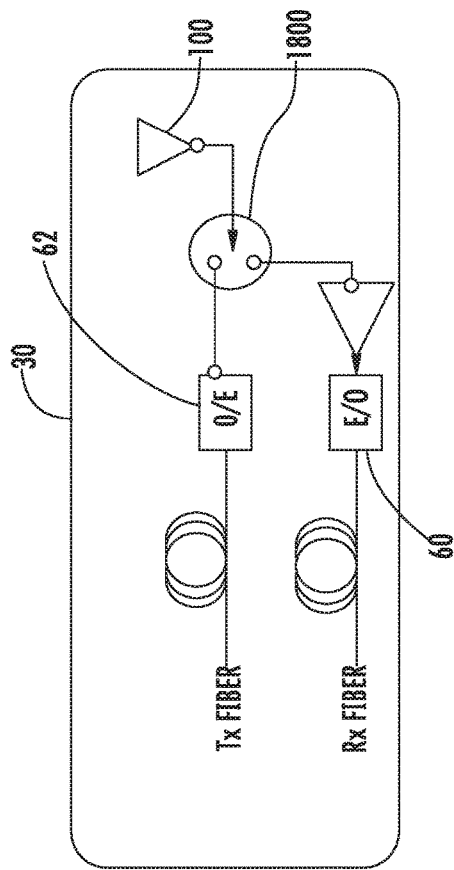
FIG. 18B is a schematic diagram of an exemplary reference unit located in a fiber optic array cable system showing one antenna and a RF switch.
Figure 18A:
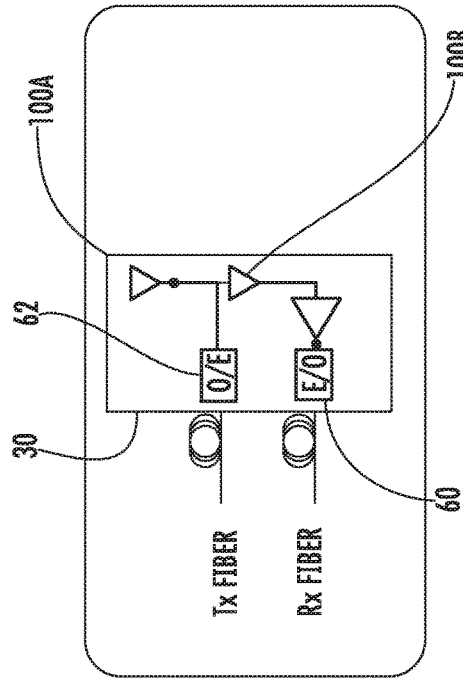
FIG. 18A is a schematic diagram of an exemplary reference unit located in a fiber optic array cable system showing two separate antennas.

FIGS. 18A and 18B show two embodiments of the reference unit 30 of the fiber optic array cable 336.

FIG. 18A is a schematic diagram of one example of a reference unit 30 connected to a fiber optic array cable 336 that comprises two separate antennas 100A and 100B. The reference unit 30 has an E/O converter 60 that receives an electrical signal from one of a pair of optical fibers and converts it to an optical signal. The optical signal is then provided to one of the two UWB antennas 100A for the transmission of a UWB-IR signal to be transmitted. The reference unit 30 has the second antenna 100B to receive a signal back from the OTT, and an O/E converter 62 that converts the received signal to an electrical signal that is transmitted over the other fiber pair.

FIG. 18B is a schematic diagram of one example of a reference unit 30 connected to a fiber optic array cable 336 showing one antenna 100 and a RF switch 1800. The one antenna 100 is a UWB antenna capable of both transmitting and receiving UWB-IR signals. The reference unit 30 also includes an E/O converter 60, an O/E converter 62, and a pair of optical fibers to receive and transmit signals.

Figure 19B:
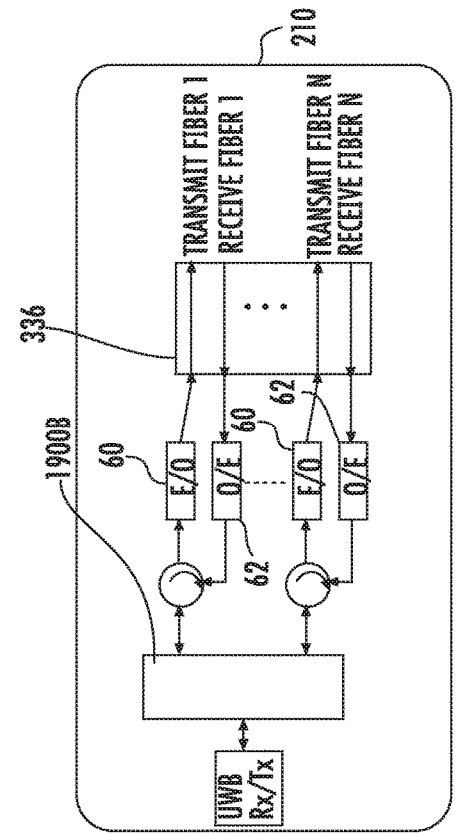
FIG. 19B is a schematic diagram of an exemplary remote head-end unit corresponding to the radio frequency switching between an electrical cable array and one bi-directional electrical cable.
Figure 19A:
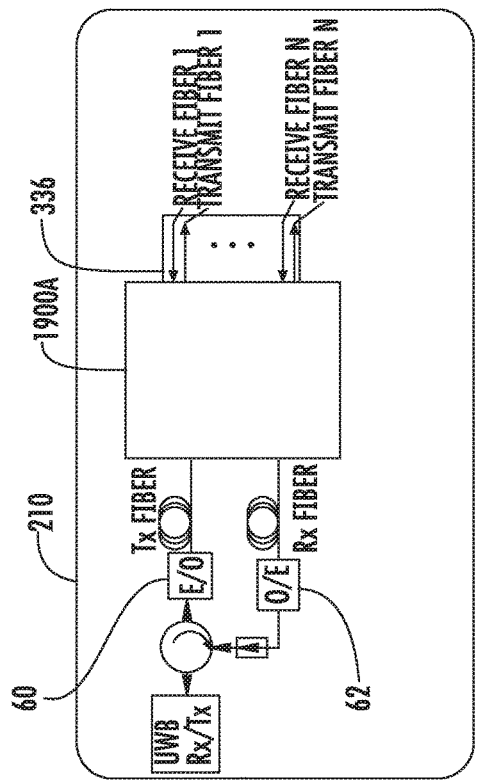
FIG. 19A is a schematic diagram of an exemplary remote head-end unit corresponding to the optical switching of signals between a fiber optic array cable and a fiber optic pair.

To be able to dynamically select to which of the reference units 30 to send the UWB signals, as discussed above with respect to FIG. 14, the central head-end station 210 may be implemented as shown in FIGS. 19A and 19B. FIG. 19A is a schematic diagram of one embodiment of the central head-end station corresponding to one fiber optic array cable 336, where the central head-end station 210 has an optical switching system 1900A, which may be comprised of two 1×N optical switches in one embodiment. The two 1×N optical switches may be used to dynamically select which of the reference units 30 in a fiber optic reference array cable 336 is selected. This exemplary embodiment requires fewer E/O/E conversions.

FIG. 19B is a schematic diagram of an alternate embodiment of a head-end station 210 corresponding to one fiber optic array cable 336, where the central head-end station 210 has a single-pole N-throw RF switch 1900B. The RF switch 1900B may be used to dynamically select which of the reference units 30 in a fiber optic array cable 336 is selected. This embodiment requires more E/O/E conversions, but the cost of this may be offset by the lower cost of the RF switch as compared to the optical switch.

In one embodiment, in which reference units 30 in different sections of a single fiber optic array cable 336 are used for tracking objects, the central head-end station 210 may be implemented as shown in FIG. 20. FIG. 20 is a schematic diagram showing the details of a central head-end station 210 that enables the use of different sections of a single fiber optic array cable 336 for three-dimensional tracking of objects. For example, as discussed above with respect to FIG. 14, four reference units 30 in a single fiber optic array cable 336 may be selected to track the location of an object. An optical switching system 2000, which may be comprised of two 2×N switches in one embodiment, is used to address each of the four reference units 30. The two 2×N switches may be replaced by a RF switch, as shown in FIG. 19B.

Figure 21:
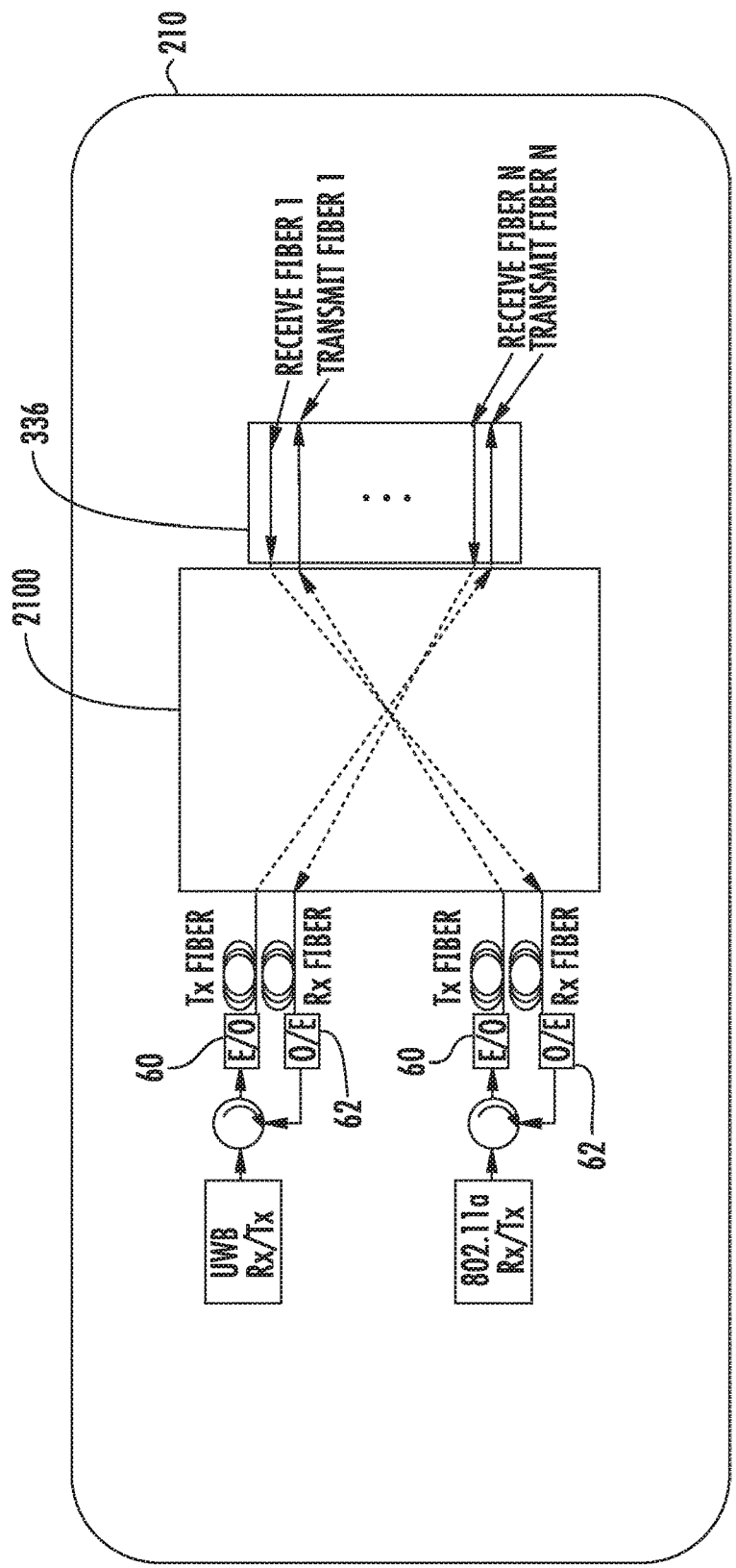
FIG. 21 is a schematic diagram showing the details of an exemplary head-end unit that enables multiple services to be supported by a single fiber optic array cable.

In another embodiment, when some of the reference units on the fiber optic array cables 336 are used for tracking objects, and other reference units 30 are used for providing other wireless services, as shown above in FIGS. 15-17, the central head-end station 210 may be implemented as shown in FIG. 21. FIG. 21 is a schematic diagram showing the details of a central head-end station 210 that enables multiple services to be supported by a single fiber optic array cable 336. An optical switching system 2100, which may be comprised of two 2×N optical switches in one embodiment, is used to implement the UWB-IR service, as well as the other wireless service. An RF switch may be used in the place of the two 2×N optical switches, as shown in FIG. 19B.

The capability of the central head-end station 210 to dynamically select the reference units 30 by activating the optical switch or RF switch enables the enhanced three-dimensional location tracking of an object by using four or more reference units 30. The capability of the central head-end station to dynamically select the reference units 30 by activating the optical switch or RF switch also enables the simultaneous tracking of multiple objects using the same fiber optic array cable 336 installation, as well as simultaneously providing both location tracking and other wireless services.

Further, as used herein, it is intended that terms "fiber optic cables" and/or "optical fibers" include all types of single mode and multi-mode light waveguides, including one or more bare optical fibers, loose-tube optical fibers, tight-buffered optical fibers, ribbonized optical fibers, bend-insensitive optical fibers, or any other expedient of a medium for transmitting light signals. Many modifications and other embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An array cable, comprising:
a plurality of electrical conductors;
a plurality of optical fibers;
an outer jacket at least partially enclosing the optical fibers and the electrical conductors; and
at least four reference units spaced from one another and disposed along a length of the cable, each reference unit having at least two antennas, at least one electrical-to-optical (E/O) converter electrically connected to at least one of the electrical conductors, and at least one optical-to-electrical (O/E) converter electrically connected to at least one of the electrical conductors,
wherein each of the reference units is configured to:
transmit radio frequency (RF) signals to a respective wireless coverage area; and
receive RF signals from an object in its respective wireless coverage area such that the received signals are used to determine a location of the object.

2. The array cable of claim 1, wherein the RF signals transmitted from the reference units are ultrawideband (UWB) signals transmitted at a frequency of at least 3.1 GHz.

3. The array cable of claim 2, wherein at least one of the reference units is located outside of the outer jacket.

4. The array cable of claim 2, wherein each reference unit is connected to at least one uplink optical fiber and at least one downlink optical fiber of the plurality of optical fibers.

5. An array cable, comprising:
a plurality of electrical conductors;
a plurality of optical fibers;
a jacket; and
at least three reference units spaced from one another and disposed along a length of the cable, each reference unit having at least two antennas, at least one electrical-to-optical (E/O) converter, and at least one optical-to-electrical (O/E) converter,
wherein each of the reference units is configured to:
transmit radio frequency (RF) signals to a respective wireless coverage area; and
receive RF signals from an object in its respective wireless coverage area such that the received signals are used to determine at least a two-dimensional location of the object.

6. The array cable of claim 5, wherein the RF signals transmitted from the reference units are ultrawideband (UWB) signals.

7. The array cable of claim 6, wherein the UWB signals are transmitted at a frequency of at least 3.1 GHz.

8. The array cable of claim 7, wherein the received signals are used to determine a three-dimensional location of the object.

9. The array cable of claim 7, wherein one or more of the reference units contains an RF switch.

10. The array cable of claim 7, wherein the reference units are located outside of the jacket.

11. The array cable of claim 5, wherein each reference unit is connected to at least one uplink optical fiber and at least one downlink optical fiber of the plurality of optical fibers.

12. An array cable, comprising:
   a fiber optic cable comprising a plurality of optical fibers and a jacket at least partially enclosing the optical fibers; and
   multiple reference units disposed along a length of the fiber optic cable, each reference unit comprising at least two antennas, at least one electrical-to-optical (E/O) converter, and at least one optical-to-electrical (O/E) converter,
   wherein each of the reference units is configured to:
      transmit ultrawideband (UWB) radio frequency (RF) signals to a respective coverage area; and
      receive signals from an object in its coverage area such that the received signals are used to determine at least a two-dimensional location of the object.

13. The array cable of claim 12, wherein the UWB RF signals are transmitted at a frequency of at least 3.1 GHz.

14. The array cable of claim 13, wherein each reference unit is connected to at least one uplink optical fiber and at least one downlink optical fiber of the plurality of optical fibers.

15. The array cable of claim 14, further comprising at least one electrical conductor electrically connected to the E/O converters and the O/E converters.

16. The array cable of claim 15, wherein at least one of the reference units is located outside of the jacket.

\* \* \* \* \*